(12) United States Patent
Cimpu et al.

(10) Patent No.: US 10,856,301 B2
(45) Date of Patent: Dec. 1, 2020

(54) METHOD AND A CONTROLLING NODE FOR CONTROLLING RESOURCES IN A SHARED CHANNEL

(71) Applicant: TELEFONAKTIEBOLAGET LM ERICSSON (PUBL), Stockholm (SE)

(72) Inventors: Virgil Cimpu, Ottawa (CA); BGary Boudreau, Kanata (CA); Kumar Balachandran, Pleasanton, CA (US)

(73) Assignee: Telefonaktiebolaget Ericsson LM (publ), Stockholm (SE)

( * ) Notice: Subject to any disclaimer, the term of this patent is extended or adjusted under 35 U.S.C. 154(b) by 0 days.

(21) Appl. No.: 16/345,872

(22) PCT Filed: Nov. 7, 2017

(86) PCT No.: PCT/IB2017/056966
§ 371 (c)(1),
(2) Date: Apr. 29, 2019

(87) PCT Pub. No.: WO2018/087663
PCT Pub. Date: May 17, 2018

(65) Prior Publication Data
US 2019/0373615 A1 Dec. 5, 2019

Related U.S. Application Data

(60) Provisional application No. 62/419,229, filed on Nov. 8, 2016.

(51) Int. Cl.
*H04W 72/08* (2009.01)
*H04W 16/14* (2009.01)
(Continued)

(52) U.S. Cl.
CPC ........ *H04W 72/082* (2013.01); *H04B 17/336* (2015.01); *H04L 5/0073* (2013.01);
(Continued)

(58) Field of Classification Search
CPC ... H04W 72/082; H04W 72/14; H04W 16/14; H04W 24/10; H04B 17/336; H04L 5/0073
See application file for complete search history.

(56) References Cited

U.S. PATENT DOCUMENTS

2014/0237547 A1   8/2014   Bose
2015/0029959 A1*  1/2015   Da ..................... H04W 72/082
                                                              370/329

(Continued)

OTHER PUBLICATIONS

Mueck Markus Dominik et al: "Licensed shared access—State-of-the-art and current challenges", 2014 1st International Workshop on Cognitive Cellular Systems (CCS), IEEE, Sep. 2, 2014 (Sep. 2, 2014), pp. 1-5, XP032667933, DOI: 10.1109/CCS.2014.6933808 [retrieved on Oct. 21, 2014] figures 1-4 sections I-V.
Federated Wireless: "CBRS Spectrum Sharing Model in US", 3GPP Draft; RP-151514 CBRS Spectrum Sharing Model in US With Track Change, 3rd Generation Partnership Project (3GPP), Mobile Competence Centre ; 650, Route Des Lucioles ; F-06921 Sophia-Antipolis Cede vol. TSG RAN, No. Phoenix, AZ; Sep. 14, 2015-Sep. 16, 2015, Sep. 15, 2015.
ISR and WO for PCT/IB2017/056966.
(Continued)

*Primary Examiner* — Melvin C Marcelo
(74) *Attorney, Agent, or Firm* — Ericsson Inc.

(57) ABSTRACT

A method in a controlling node for controlling resources in a shared channel is provided. The method comprises: receiving from a network node, a request for resources in the shared channel; in response to the request, determining a utility function representing a performance metric for the network node based on transmissions from other network nodes using the shared channel; and in response to determining that the utility function satisfies a threshold, granting the resources in the shared channel to the network node. A controlling node is also provided for performing this method. The controlling node can be a Spectrum Access System (SAS), for example.

16 Claims, 10 Drawing Sheets

(51) Int. Cl.
H04B 17/336 (2015.01)
H04L 5/00 (2006.01)
H04W 24/10 (2009.01)
H04W 72/14 (2009.01)

(52) U.S. Cl.
CPC .......... *H04W 16/14* (2013.01); *H04W 24/10* (2013.01); *H04W 72/14* (2013.01)

(56) References Cited

U.S. PATENT DOCUMENTS

2015/0305051 A1* 10/2015 Xia ................. H04W 72/08
370/329
2016/0262024 A1 9/2016 Freda

OTHER PUBLICATIONS

D Schmidt et al. "Comparison of Distributed Beamforming Algorithms for MIMO Interference Networks", IEEE Transactions on Signal Processing, vol. 61, No. 13, Jul. 2013.
K. Gomadam, V. Cadambe and S. Jafar, "A Distributed Numerical Approach to Interference Alignment and Applications to Wireless Interference Networks", IEEE Transactions on Information Theory, vol. 57, No. 6, Jun. 2011, pp. 3.
V. Cadambe and S. Jafar, "Interference Alignment and Degrees of Freedom of the K-User Interference Channel", IEEE Transactions on Information Theory, vol. 54, No. 8, Aug. 2008, pp. 3425-3441.

* cited by examiner

METHOD AND A CONTROLLING NODE FOR CONTROLLING RESOURCES IN A SHARED CHANNEL

RELATED APPLICATIONS

The present application claims the benefits of priority of U.S. Provisional Patent Application No. 62/419,229, entitled "Methods and Apparatus for coexistence management in shared spectrum scenarios", and filed at the United States Patent and Trademark Office on Nov. 8, 2016, the content of which is incorporated herein by reference.

TECHNICAL FIELD

The present description generally relates to methods and apparatus for coexistence management in shared spectrum scenarios.

BACKGROUND

The advance of mobile cellular networks and the popularity of mobile devices combined with the constant growth in user throughput have created a huge demand for one resource: spectrum.

There are three main approaches on spectrum management:
- License the spectrum to operators, who will pay significant fees for the privilege of using dedicated spectrum;
- Unlicensed spectrum where devices are sharing the same spectrum using a set of predetermined rules aimed at insuring fair spectrum access; and
- Shared spectrum, e.g., Licensed Shared Access (LSA) or Authorized shared access (ASA), usually proposing a division of rights of use, based on time of use or geographical constraints between mobile operators and possibly an incumbent user.

This disclosure is concerned with the third (last) approach, which proposes a shared spectrum approach. A typical use of this scenario is to enable use of a band that is available for licensed users in some markets, but is being restricted in others because of incumbents, such as radar or satellite systems. Incumbent systems can be protected around the area of deployment, while authorization for mobile infrastructure can be granted in such a way that aggregate interference from mobile systems towards the incumbent is limited to an acceptable level of noise rise or performance degradation. In LSA, the mobile operator is licensed to operate in permitted or authorized areas, and is the reasonable regulatory approach to ASA.

The introduction of Licensed Shared Access (LSA) in the 2.3 GHz band will allow binary sharing between the incumbent, namely terrestrial radar stations in e.g. France, and LTE with the aid of a spectrum repository known as the LSA repository. Such regulation aims at unlocking spectrum designated as an International Mobile Telecommunications (IMT) band in the International Telecommunications Union (ITU) in markets, and subsequently offered a band designation in 3GPP, namely Band 40.

The creation in USA of the new Citizens Broadband Radio Service (CBRS) in the 3.5 GHz band, currently occupied by incumbents like the Department of Defense, will add much-needed capacity to meet the ever-increasing demands of wireless innovation. The CBRS represents a more aggressive application of ASA to spectrum, where in addition to long-term geographic licenses shared with incumbents, multiple operators may also coexist in close geographical proximity to one another.

Sharing in the 3.5 GHz band occurs between three tiers of users, with higher tiers being accorded lower priority. Access to the spectrum is governed by a Spectrum Access System (SAS) that implements a geolocation database and policy management function to be used to protect incumbents as well as implement a tiered access framework. Incumbent users represent the highest tier in this framework and receive interference protection from Citizens Broadband Radio Service users. Protected incumbents include the federal operations described above, as well as Fixed Satellite Service (FSS) and, for a finite period, grandfathered terrestrial wireless operations in the 3650-3700 MHz portion of the band. The Citizens Broadband Radio Service itself consists of two tiers—Priority Access and General Authorized Access (GAA)—both authorized in any given location and frequency by an SAS. As the name suggests, Priority Access operations receive protection from GAA operations. Priority Access Licenses (PALs), defined as an authorization to use a 10 megahertz channel in a single census tract for three years or longer, will be assigned in up to 70 megahertz of the 3550-3650 MHz portion of the band. GAA use will be allowed, by rule, throughout the 150 megahertz band. GAA users will receive no interference protection from other Citizens Broadband Radio Service users. The band has been designed for deployment of small cells, although there is sufficient capability in the rules to provision wide area macro deployments as well.

FIG. 1 illustrates the spectrum anatomy for the 3.5 GHz Citizens Broadband Radio Service. As can be seen in FIG. 1, the incumbent users of the first tier are the radar users and FSS users, for example. PAL, GAA and WISPA (Wireless Internet Service Providers Association) users constitute the second tier. GAA users also constitute the third tier.

A Citizens Broadband radio Service Device (CBSD) will first register with the SAS and provide its location information among other registration parameters, and then it will ask the SAS to grant access in a certain channel. Before granting access, the SAS will use information from the Environmental Sensing Capability (ESC) network to detect incumbent activity in the area where the CBSD operates. The SAS will also use measurement reports from the other CBSDs in the same area to determine the level of interference in a certain channel as well as if the channel needs to be protected due to PAL user activity.

SUMMARY

At least the following problems may be envisioned:
Coexistence in unlicensed channels has traditionally been managed with distributed algorithms using carrier sensing techniques, like for example the Listen Before Talk (LBT) algorithm used by WiFi and LAA. But these algorithms are not applicable for all technologies, such as LTE.

Certain aspects and their embodiments of the present disclosure may provide solutions to these or other problems.

The introduction of a centralized Spectrum Access System (SAS) in CBRS band, opens the possibility of introducing new coexistence algorithms that are technology neutral.

For example, embodiments of the present invention propose a coexistence management method for the CBRS spectrum. The method may be implemented in the centralized Spectrum Access System (SAS) as a logical co-existence manager (CxM) entity, or implemented separately from the SAS as a standalone CxM, and is applied to access the "General Authorized Access (GAA)" available spectrum.

A CBSD must obtain a grant from SAS before starting transmitting in a channel. The grant must be obtained even for GAA channels. The serving SAS will receive the CBSD grant request and it will evaluate if the services provided by the CBSD requesting the grant will provide higher value than the impact/interference that the CBSD will cause to the other CBSDs operating in the same area.

The SAS already has the mandate to protect incumbent and PAL users from interference caused by GAA users. The embodiments also allow the SAS to arbitrate the impact between GAA users.

According to some embodiments, a User Value (UV) function is introduced to indicate the value that the CBSD will provide to an End User Device (EUD). The UV function is used to evaluate the average user value in the coverage area of the CBSD before and after the CBSD is allowed to transmit. The CBSD grant is approved only if the positive effect of introducing the CBSD surpasses the negative impact.

According to some embodiments, the SAS further uses several methods to mitigate interference between network nodes.

According to one aspect, some embodiments include a method performed by a controlling node for controlling resources in a shared channel. The method generally comprises receiving from a network node, a request for resources in a shared channel; in response to the request, determining a utility function representing a performance metric for the network node based on transmissions from other network nodes using the shared channel; and in response to determining that the utility function satisfies a threshold, granting the resources in the shared channel to the network node.

According to another aspect, some embodiments include a controlling node configured, or operable, to perform one or more functionalities (e.g. actions, operations, steps, etc.) as described herein. For example, it can perform the above method.

In some embodiments, the controlling node may comprise one or more communication interfaces configured to communicate with one or more network nodes, and processing circuitry operatively connected to the communication interface, the processing circuitry being configured to perform one or more functionalities as described herein. For example, the processing circuitry is configured: to receive from a network node, a request for resources in a shared channel; in response to the request, determine a utility function representing a performance metric for the network node based on transmissions from other network nodes using the shared channel; and in response to determining that the utility function satisfies a threshold, grant the resources in the shared channel to the network node.

In some embodiments, the processing circuitry may comprise at least one processor and at least one memory storing instructions which, upon being executed by the processor, configure the at least one processor to perform one or more functionalities as described herein.

In some embodiments, the controlling node may comprise one or more functional modules configured to perform one or more functionalities as described herein.

According to another aspect, some embodiments include a non-transitory computer-readable medium storing a computer program product comprising instructions which, upon being executed by processing circuitry (e.g., at least one processor) of the controlling node, configure the processing circuitry to perform one or more functionalities as described herein.

Some embodiments may enable sharing the available GAA spectrum between CBSD devices independent of the technology being used by each device.

It is to be noted that any feature of any of the embodiments disclosed herein may be applied to any other embodiment, wherever appropriate. Likewise, any advantage of any of the embodiments may apply to the other embodiments, and vice versa. Certain embodiments may have some, or none of the above advantages. Other advantages will be apparent to persons of ordinary skill in the art. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

This summary is not an extensive overview of all contemplated embodiments, and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

Various features and embodiments will now be described with reference to the figures to fully convey the scope of the disclosure to those skilled in the art.

Many aspects will be described in terms of sequences of actions or functions. It should be recognized that in some embodiments, some functions or actions could be performed by specialized circuits, by program instructions being executed by one or more processors, or by a combination of both.

Further, some embodiments can be partially or completely embodied in the form of computer readable carrier or carrier wave containing an appropriate set of computer instructions that would cause a processor to carry out the techniques described herein.

In some alternate embodiments, the functions/actions may occur out of the order noted in the sequence of actions. Furthermore, in some illustrations, some blocks, functions or actions may be optional and may or may not be executed; these are generally illustrated with dashed lines.

Figure 1:
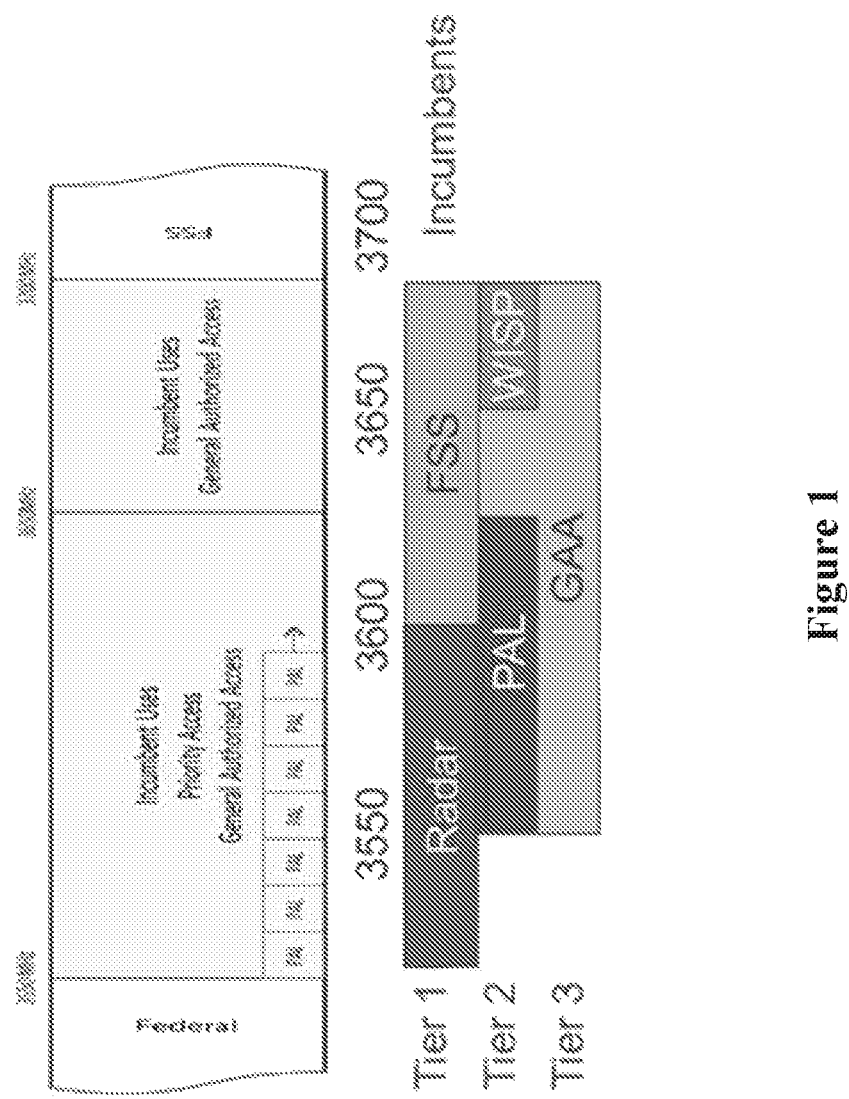
FIG. 1 illustrates the spectrum anatomy for the 3.5 GHz Citizens Broadband Radio Service.
Figure 2:
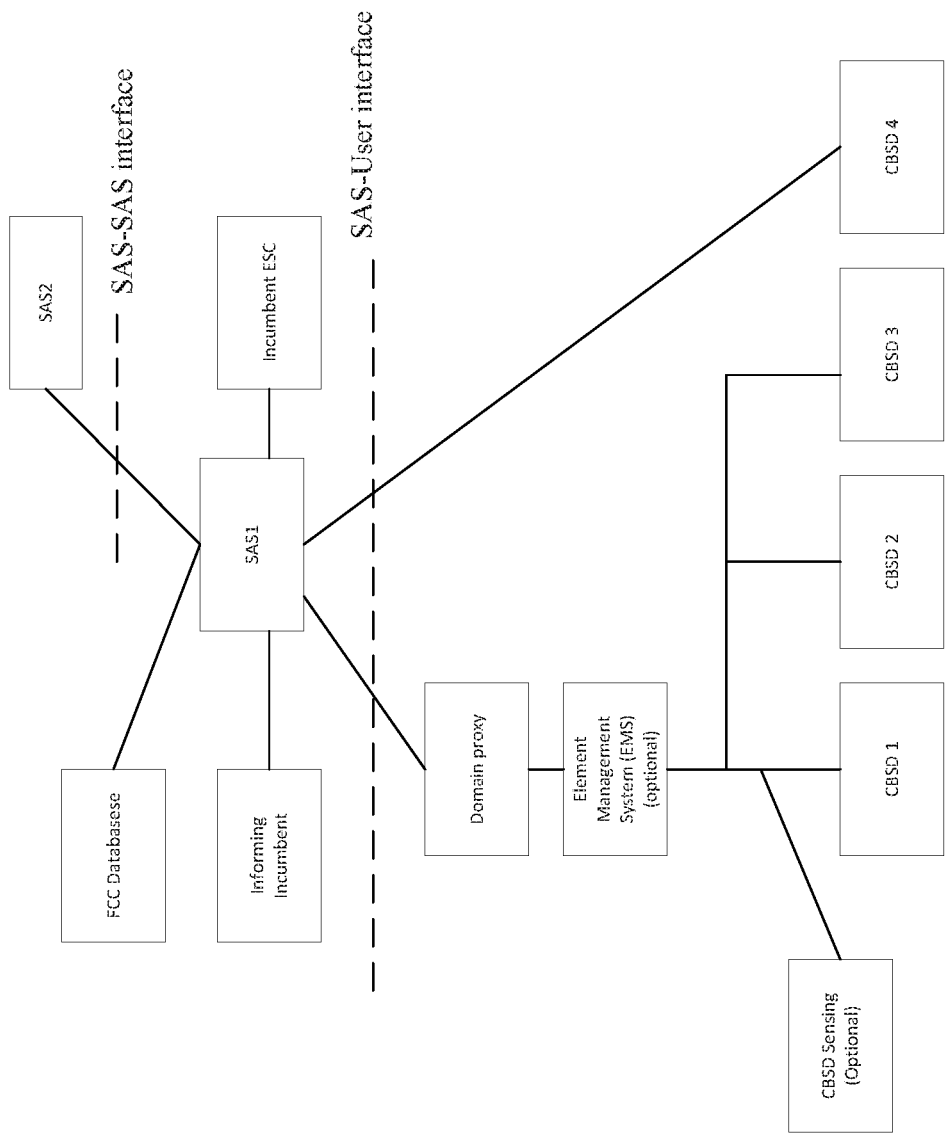
FIG. 2 illustrates the SAS architecture.

The SAS Architecture is depicted in FIG. 2, a proposed by the Federal Communications Commission (FCC) for the 3.5 GHz band. The SAS is a central entity or system for coordinating, authorizing and managing use of the CBRS spectrum, protecting higher tier operations from interference, and maximizing frequency capacity for all CBRS operators. The SAS may be referred to as a controlling node. The SAS administrators will be permitted to charge CBRS operators fees for registration and frequency coordination services. There may be one or more SAS, such as SAS1 and SAS2 connected to each other.

As illustrated in FIG. 2, for example, SAS1 is also connected to FCC databases, an Environmental Sensing Capability (ESC) system for incumbent detection, an informing incumbent system, a domain proxy and CBSDs (e.g. CBSD4). The Domain Proxy can be optionally connected to an Element Management System (EMS). The EMS can be connected to a plurality of CBSDs, such as CBSD1, CBSD2, CBSD3, etc. Each CBSD domain may optionally include some sensing capability systems (e.g. CBSD sensing).

The FCC requires that transmission equipment with specific, standardized capabilities be employed by CBRS operators for use in the 3.5 GHz band. This equipment is called Citizens Broadband Service Device ("CBSD"). CBDSs are fixed base stations/access points, such as an LTE Evolved Universal Terrestrial Radio Access Network (E-UTRAN) Node Bs (also commonly denoted as evolved Node Bs, enhanced Node Bs, eNodeBs, or eNBs). There are two types of CBDSs: Category A (a lower power CBSD) and Category B (a higher power CBSD). The CBSDs can only operate under the authority and management of a centralized Spectrum Access System.

CBRS end user devices are controlled by an authorized CBSD. End User Devices (EUD) have the capability to receive and decode information from a CBSD. The users access a communication network through one or more CBSDs and, when granted permission from the SAS, use resources within the shared band.

Some of the SAS' functionalities are as follows:
Determine and provide to CBSDs the permissible channels or frequencies at their location.
Determine and provide to CBSDs the maximum permissible transmission power level at their location.
Communicate with the ESC to obtain information about federal Incumbent User transmissions and instruct CBSDs to move to another frequency range or cease transmissions.
Ensure that CBSDs operate in geographic areas and within the maximum power levels required to protect federal Incumbent Users from harmful interference.
Register and authenticate the identification information and location of CBSDs.
Ensure that CBSDs protect non-federal Incumbent Users from harmful interference.
Protect Priority Access Licensees from interference caused by other PALs and from General Authorized Access Users.
Facilitate coordination between GAA users operating Category B CBSDs.
Resolve conflicting uses of the band while maintaining, as much as possible, a stable radio frequency environment.
Ensure secure and reliable transmission of information between the SAS and CBSDs.
Protect Grandfathered Wireless Broadband Licensees.
Implement the terms of current and future international agreements as they relate to the Citizens Broadband Radio Service.

The ESC monitors for incumbent radar activity in coastal areas and near inland military bases. For example, the ESC can employ spectrum sensing technologies in conjunction with the SAS, in order to allow CBRS users to operate near coastlines on frequencies not being used by the federal radar systems. When incumbent activity is detected, the ESC communicates that information to SAS1. The SAS or SASs will reconfigure local devices within 60s to avoid interfering with the detected incumbent radars, for example.

The FCC databases include information related to commercial users and corresponding licenses (e.g., site-based licensing information). SAS1 and SAS2 are capable of directly interfacing with the FCC databases to access information used for SAS operations.

The Domain Proxy is a managing intermediary. A Domain Proxy's function is to, for example:
Accept a set of one or more available channels and select channels for use by specific CBSDs, or alternatively pass the available channels to the carrier EMS for CBSD channel selection;
EMS may optionally be co-located with the domain proxy;
Back report selected channels to SAS optionally received via EMS;
Receives confirmation of channel assignment from SAS;
Performs bidirectional bulk CBSD registration and directive processing, optionally through carrier EMS if present;
Perform bidirectional information processing and routing;
E.g. interference reporting, etc.

When sharing spectrum resources between devices and networks using different technologies, one of the most important questions raised is about fairness. If only one device provides service in an area, then the device can use all the available spectrum. However, if multiple devices are present in the same area, a method is required to divide spectrum resources between devices or clusters of devices, either in the time domain or in the frequency domain, or alternatively in a manner where the signal quality between a base station device and its end-user devices is sufficiently higher than the aggregate interference offered by other authorized base station devices and their respective end user clients or subscribers respectively.

Several metrics can be used for fairness assessment:

Assigned spectrum bandwidth:
Each device gets access to an equal amount of spectrum resources.
Each network of devices gets access to an equal amount of spectrum resources.

Provided Coverage:
Each device or group of coordinated network nodes gets access to spectrum resources proportional to the provided coverage.

Density of CBSDs or EUDs:
Each device or group of coordinated network nodes is provided access to spectrum resources proportional to the density of CBSDs and/or EUDs in a given area. This metric or rule can also be adapted to a 3-dimensional volume for enterprise type deployments.
Each device is provided bandwidth in proportion to the coverage area of the individual node for the maximum Effective Isotropic Radiated Power (EIRP) of the device within the limits in the band, e.g., 47 dBm/10 MHz for a category B CBSD authorized within the CBRS.

Proportional to number of grants per unit area:
Each device or coordinated group of devices is provided access to spectrum resources proportional to the number of grants per unit area that the serving SAS or Co-existence Manager (CxM) approves.

Number of served EUDs:
Each device gets access to spectrum resources proportional to the served number of End User Devices (EUDs).

Spectral efficiency:
The devices with higher spectral efficiency get access to a larger amount of spectrum. This will encourage better utilization of spectrum resources.

Application level goodput:
Each device gets access to spectrum resources proportional to the provided good application throughput.

Interference generated towards other in-band/out-of-band users:
Devices generating a lower interference level towards other users in-band or in other out-of-band channels get access to larger amount of spectrum.

Interference generated by a co-existence group (CxG) to other co-existence groups:
Spectrum resources are allocated to a given co-existence group based on the maximum aggregate interference generated by all EUDs and/or network nodes within the co-existence group which is seen or impacts devices and/or network nodes in other co-existence groups.

Another important factor in deciding the spectrum sharing algorithm is the behavior of a device which is integrated in a network. For example, LTE requires the devices belonging to the same network to have a common channel used for mobility.

Figure 3:
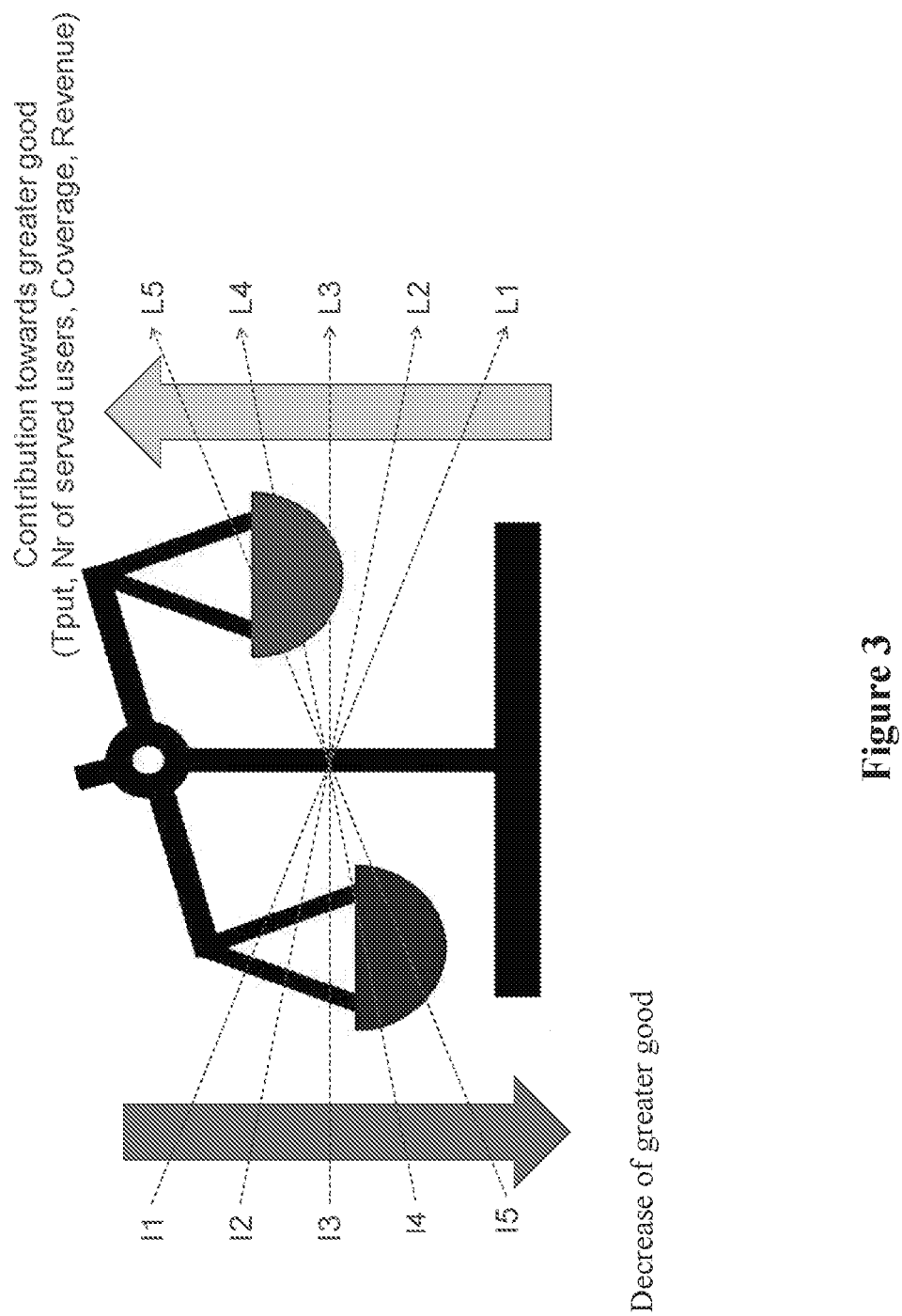
FIG. 3 illustrates the fairness balance concept.

To generalize, a fairness balance has to be achieved between the contribution of a device to the "greater good" and the impact of the device towards the other devices operating in the same area. FIG. 3 illustrates the fairness balance concept.

In order to evaluate a device contribution to the greater good, a User Value (UV) function is introduced. The UV function is a utility function or a metric that expresses the value provided by the CBSD device to an end user device present in a certain location. It should be noted that the terms "UV function", "utility function" and "metric" are equivalent terms and can be used interchangeably.

One example of the UV function is the throughput provided to an End User Device. Since the user throughput is directly proportional to the Signal-to-Interference plus Noise Ratio (SINR) and the SINR value is something that the SAS can estimate, the proposal is to use SINR as a UV function. For the devices that are sharing the same channel, the SINR is based on the actual time that the device is scheduled to transmit in the channel.

Another possible utility function is to employ signal leakage to noise ratio (SLNR) which is a measure of the amount of interference generated by one network node as seen by other network nodes and/or devices. Another variation of the SLNR approach is to define a maximum threshold for the interference to other CBSDs and maximize the SINR at the desired CBSD subject to the maximum interference leakage condition. The SLNR approach is capable of admitting more diverse use cases such as fixed wireless access and backhaul.

Figure 4:
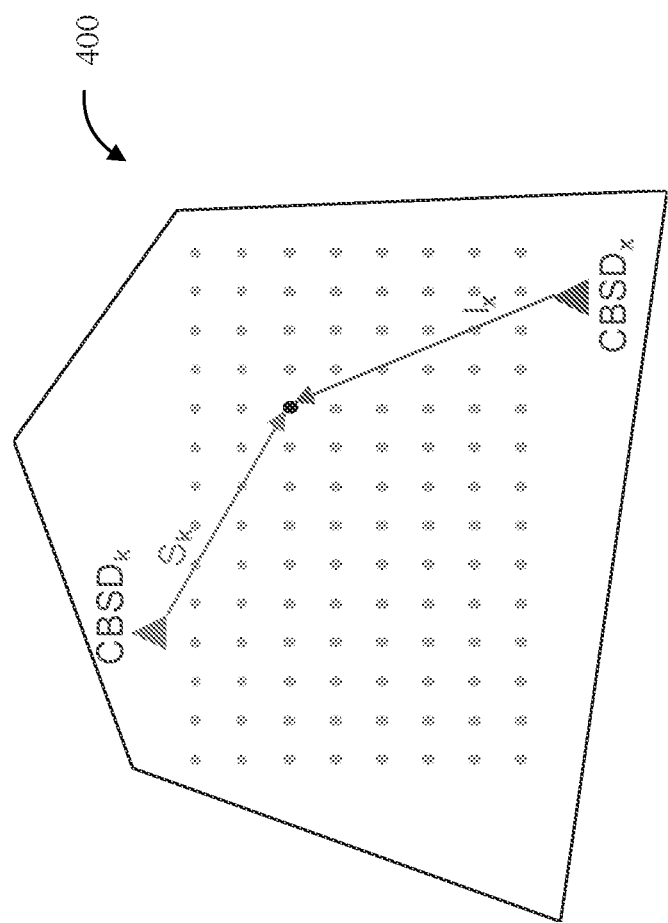
FIG. 4 is a schematic illustration of an end user device evaluation grid.

Methods to Assess Relative Interference Between Network Nodes in Shared Spectrum FIG. 4 illustrates a EUD Evaluation Grid (EG) 400. For example, N evaluation points are defined for the EG 400. The EG 400 could be seen as a map representing a geographical area, which is divided into different location points corresponding to the evaluation points (or pixels). The coverage area of a CBSD could be part of the evaluation grid, for example.

A user value (UV) is computed for each "pixel" in the evaluation grid. Assuming that a EUD served by CBSD k is located in the EG pixel n, then the user value for that location denoted as UV(k,n) reflects the "service" value that the user will receive from CBSD k. In general, the UV is dependent of the signal level received from the serving CBSD and it is negatively impacted by interference from the other CBSDs operating in the same channel and the noise level. The value of UV(k,n) can be based on computed values of propagation loss from standard propagation models such as modified Hata (see https//en.wikipedia.org/wiki/Hata_Model) or Longley Rice (https://en.wikipedia.org/wiki/Longley%E2%80%93Rice_model), or by direct channel measurements, for example. In LTE, such direct channel measurements can include RSRP, RSRQ, CSI-RS and RS-SINR measurements. Other measured metrics may also be employed.

When a new CBSD x is introduced in the same channel, it will produce interference towards the users of CBSD k. The SAS will compute the user values as:

Before the CBSD x is introduced: UVpre_x(k,n)
After the CBSD x is introduced: UVpost_x(k,n).
For example, Sk refers to the Signal from serving CBSD k, and Ix refers to the Interference from CBSD x.

The relative user value (RUV) for the pixel n and serving CBSD k is given by:

$$RUV_x(k,n) = UVpost\text{-}x(k,n) - UVpre\text{-}x(k,n)$$

The average relative user value (ARU) over all pixels for EUDs served by CBSD k is:

$$ARUx(k,n) = \Sigma_{n=1}^{N}(UVpost\_x(k,n) - UVpre\_x(k,n))/N$$
(k)

where N is the total number of pixels.

One particular case is the average user value introduced by CBSD x:

$$ARUVx(x) = ARUx(x) = \Sigma_{n=1}^{N}(UVpost\_x(x,n))/N$$

where UVpost_x(x,n) is used if it is greater than a threshold γ.

Before releasing a grant for CBSD x, the SAS shall make sure that a total average relative user value satisfies the following:

$$\Sigma_{k=1}^{K}(ARUVx(k)) >= Th$$

where Th is the overall threshold used for grant approval, as an example, Th=0, and k=1 to K representing the number of CBSDs using the same channel.

Figure 5:
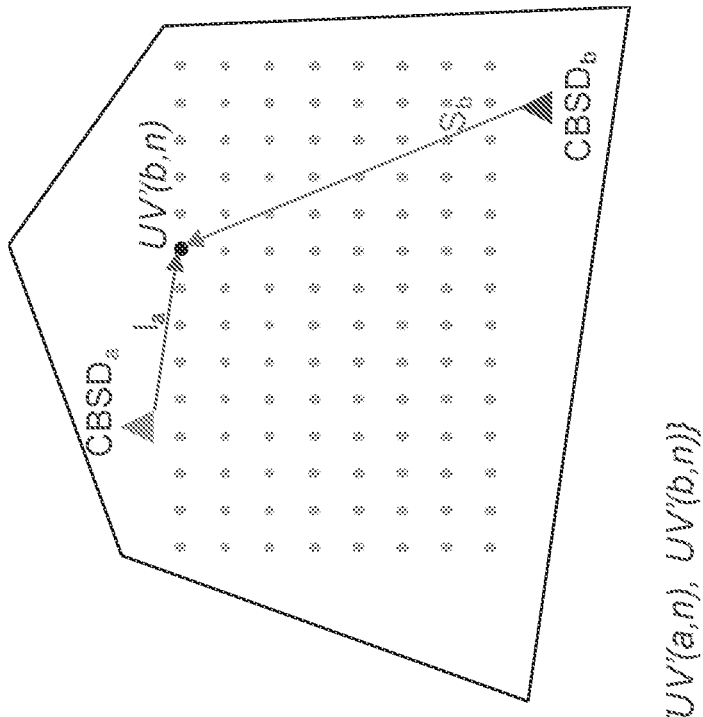
FIG. 5 is a schematic illustration of CBSD a and CBSD b belonging to the same network.
Figure 5:
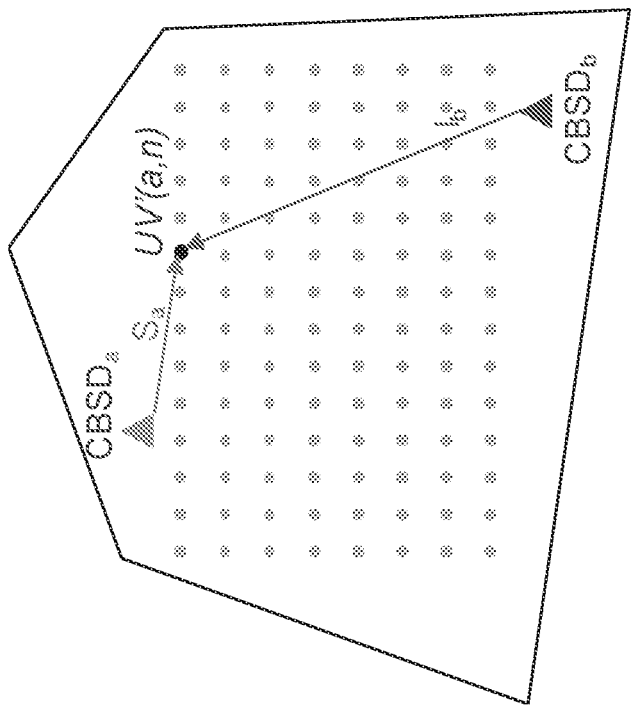

A special handling will be done for CBSDs belonging to the same network (see FIG. 5, which shows that CBSD a and CBSD b belong to the same network, such as LTE). If CBSD a and CBSD b belong to the same network, then the user value will be the maximum provided by either CBSD a or b:

$$UV(a,n)=UV(b,n)=\max\{UV'(a,n),UV'(b,n)\}$$

Where UV' is the raw computed user value and UV is the value used by SAS to determine grant eligibility.

Network Deployments should increase the user value as compared with independent CBSD deployments.

Figure 6:
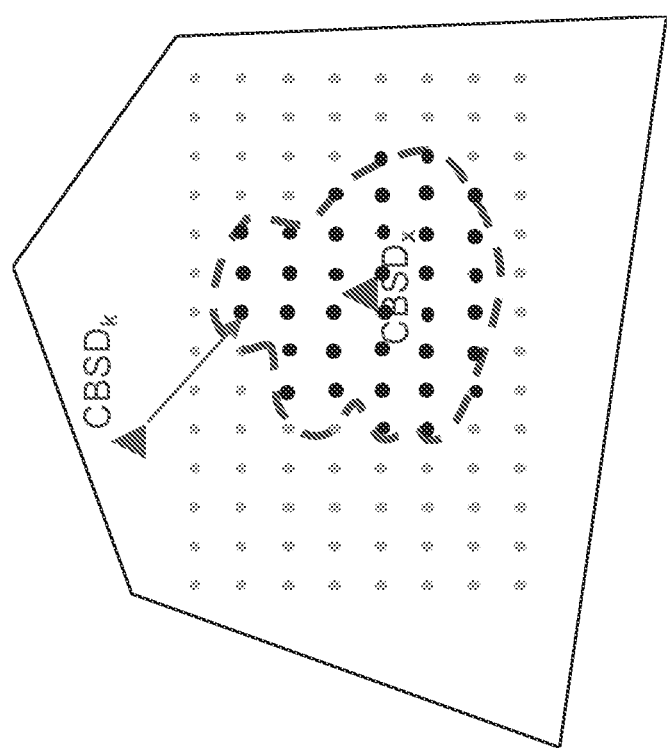
FIG. 6 is a schematic illustration of a pool of impacted CBSDs.

The evaluation grid for approving a grant for CBSD x shall be selected to cover all the pixels that are within the CBSD x coverage area. The coverage area of a CBSD is the area around the CBSD where the signal level is greater or equal than a certain signal threshold STh. For example, one possible value for STh is −96 dBm/10 MHz, which will match the contour definition for a PAL Protection Area (PPA). The PPA represents a region in which interference has to be below a given threshold. Next the SAS will determine all the CBSD k that can impact the pixels selected for evaluation by more than STh threshold. These CBSDs shall be considered as part of the pool of impacted CBSDs (see FIG. 6). FIG. 6 illustrates the coverage area of the CBSD x.

The following example illustrates how the User Value approach works with some concrete values.

Let CBSD1 be an existing micro Remote Radio Unit (microRRU) transmitting in a grid. The CBSD is located at position (x=7, y=10.001), and transmitting with an EIRP of 47 dBm/10 MHz. The signal from CBSD1 is represented in Table 1. The green (or dark) area represents the CBSD1 coverage area using −96 dBm contour.

TABLE 1

CBSD1 signal

| Signal k | 1 | 2 | 3 | 4 | 5 | 6 | 7 | 8 | 9 | 10 |
|---|---|---|---|---|---|---|---|---|---|---|
| 1 | −106.8 | −106.0 | −105.2 | −104.5 | −104.0 | −103.7 | −103.6 | −103.7 | −104.0 | −104.5 |
| 2 | −105.4 | −104.4 | −103.5 | −102.7 | −102.1 | −101.7 | −101.6 | −101.7 | −102.1 | −102.7 |
| 3 | −104.0 | −102.8 | −101.7 | −100.7 | −99.9 | −99.4 | −99.2 | −99.4 | −99.9 | −100.7 |
| 4 | −102.6 | −101.2 | −99.8 | −98.5 | −97.5 | −96.8 | −96.6 | −96.8 | −97.5 | −98.5 |
| 5 | −101.2 | −99.4 | −97.7 | −96.1 | −94.7 | −93.7 | −93.4 | −93.7 | −94.7 | −96.1 |
| 6 | −99.8 | −97.7 | −95.5 | −93.4 | −91.5 | −90.1 | −89.5 | −90.1 | −91.5 | −93.4 |
| 7 | −98.5 | −96.1 | −93.4 | −90.6 | −87.7 | −85.4 | −84.5 | −85.4 | −87.7 | −90.6 |
| 8 | −97.5 | −94.7 | −91.5 | −87.7 | −83.5 | −79.4 | −77.5 | −79.4 | −83.5 | −87.7 |
| 9 | −96.8 | −93.7 | −90.1 | −85.4 | −79.4 | −71.5 | −65.5 | −71.5 | −79.4 | −85.4 |
| 10 | −96.6 | −93.4 | −89.5 | −84.5 | −77.5 | −65.4 | 3.4 | −65.4 | −77.5 | −84.5 |
| 11 | −96.8 | −93.7 | −90.1 | −85.4 | −79.4 | −71.5 | −65.4 | −71.5 | −79.4 | −85.4 |
| 12 | −97.5 | −94.7 | −91.5 | −87.7 | −83.5 | −79.4 | −77.5 | −79.4 | −83.5 | −87.7 |
| 13 | −98.5 | −96.1 | −93.4 | −90.5 | −87.7 | −85.4 | −84.5 | −85.4 | −87.7 | −90.5 |
| 14 | −99.8 | −97.7 | −95.5 | −93.4 | −91.5 | −90.0 | −89.5 | −90.0 | −91.5 | −93.4 |
| 15 | −101.1 | −99.4 | −97.7 | −96.1 | −94.7 | −93.7 | −93.4 | −93.7 | −94.7 | −96.1 |
| 16 | −102.6 | −101.1 | −99.8 | −98.5 | −97.5 | −96.8 | −96.6 | −96.8 | −97.5 | −98.5 |
| 17 | −104.0 | −102.8 | −101.7 | −100.7 | −99.9 | −99.4 | −99.2 | −99.4 | −99.9 | −100.7 |
| 18 | −105.4 | −104.4 | −103.5 | −102.7 | −102.1 | −101.7 | −101.6 | −101.7 | −102.1 | −102.7 |
| 19 | −106.8 | −105.9 | −105.2 | −104.5 | −104.0 | −103.7 | −103.6 | −103.7 | −104.0 | −104.5 |
| 20 | −108.1 | −107.4 | −106.7 | −106.2 | −105.8 | −105.5 | −105.4 | −105.5 | −105.8 | −106.2 |

| Signal k | 11 | 12 | 13 | 14 | 15 | 16 | 17 | 18 | 19 | 20 |
|---|---|---|---|---|---|---|---|---|---|---|
| 1 | −105.2 | −106.0 | −106.8 | −107.7 | −108.7 | −109.6 | −110.7 | −111.6 | −112.5 | −113.4 |
| 2 | −103.5 | −104.4 | −105.4 | −106.5 | −107.6 | −108.7 | −109.7 | −110.8 | −111.8 | −112.8 |
| 3 | −101.7 | −102.8 | −104.0 | −105.3 | −106.5 | −107.7 | −108.9 | −110.1 | −111.2 | −112.2 |
| 4 | −99.8 | −101.2 | −102.6 | −104.0 | −105.4 | −106.8 | −108.1 | −109.4 | −110.5 | −111.7 |
| 5 | −97.7 | −99.4 | −101.2 | −102.8 | −104.4 | −105.9 | −107.4 | −108.7 | −110.0 | −111.2 |
| 6 | −95.5 | −97.7 | −99.8 | −101.7 | −103.5 | −105.2 | −106.7 | −108.2 | −109.5 | −110.8 |
| 7 | −93.4 | −96.1 | −98.5 | −100.7 | −102.7 | −104.5 | −106.2 | −107.7 | −109.1 | −110.5 |
| 8 | −91.5 | −94.7 | −97.5 | −99.9 | −102.1 | −104.0 | −105.8 | −107.4 | −108.8 | −110.2 |
| 9 | −90.1 | −93.7 | −96.8 | −99.4 | −101.7 | −103.7 | −105.5 | −107.2 | −108.7 | −110.1 |
| 10 | −89.5 | −93.4 | −96.6 | −99.2 | −101.6 | −103.6 | −105.4 | −107.1 | −108.6 | −110.0 |
| 11 | −90.1 | −93.7 | −96.8 | −99.4 | −101.7 | −103.7 | −105.5 | −107.2 | −108.7 | −110.1 |
| 12 | −91.5 | −94.7 | −97.5 | −99.9 | −102.1 | −104.0 | −105.8 | −107.4 | −108.8 | −110.2 |
| 13 | −93.4 | −96.1 | −98.5 | −100.7 | −102.7 | −104.5 | −106.2 | −107.7 | −109.1 | −110.5 |
| 14 | −95.5 | −97.7 | −99.8 | −101.7 | −103.5 | −105.2 | −106.7 | −108.2 | −109.5 | −110.8 |
| 15 | −97.7 | −99.4 | −101.1 | −102.8 | −104.4 | −105.9 | −107.4 | −108.7 | −110.0 | −111.2 |
| 16 | −99.8 | −101.1 | −102.6 | −104.0 | −105.4 | −106.8 | −108.1 | −109.4 | −110.5 | −111.7 |
| 17 | −101.7 | −102.8 | −104.0 | −105.3 | −106.5 | −107.7 | −108.9 | −110.1 | −111.2 | −112.2 |
| 18 | −103.5 | −104.4 | −105.4 | −106.5 | −107.6 | −108.7 | −109.7 | −110.8 | −111.8 | −112.8 |
| 19 | −105.2 | −105.9 | −106.8 | −107.7 | −108.7 | −109.6 | −110.6 | −111.5 | −112.5 | −113.4 |
| 20 | −106.7 | −107.4 | −108.1 | −108.9 | −109.7 | −110.6 | −111.5 | −112.3 | −113.2 | −114.0 |

SINR is used for the User Value function, as an example. Table 2 depicts the relationship between SINR and the user throughput.

TABLE 2

Relationship between SINR and UE throughput

| SINR Value | Throughput |
|---|---|
| >10 | Excellent |
| 6 to 10 | Good |
| 0 to 5 | Fair |
| <0 | Poor |

Table 3 illustrates the CBSD1 User Value (i.e. SINR).

TABLE 3

CBSD1 SINR pre-CBSD2 introduction

| SINR k pre | 1 | 2 | 3 | 4 | 5 | 6 | 7 | 8 | 9 | 10 |
|---|---|---|---|---|---|---|---|---|---|---|
| 1 | −12.3 | −11.5 | −10.7 | −10.1 | −9.6 | −9.3 | −9.2 | −9.3 | −9.6 | −10.1 |
| 2 | −11.0 | −10.0 | −9.0 | −8.3 | −7.6 | −7.2 | −7.1 | −7.2 | −7.6 | −8.3 |
| 3 | −9.6 | −8.4 | −7.2 | −6.3 | −5.5 | −5.0 | −4.8 | −5.0 | −5.5 | −6.3 |
| 4 | −8.1 | −6.7 | −5.3 | −4.0 | −3.0 | −2.3 | −2.1 | −2.3 | −3.0 | −4.0 |
| 5 | −6.7 | −5.0 | −3.2 | −1.6 | −0.2 | 0.7 | 1.1 | 0.7 | −0.2 | −1.6 |
| 6 | −5.3 | −3.2 | −1.1 | 1.1 | 3.0 | 4.4 | 4.9 | 4.4 | 3.0 | 1.1 |
| 7 | −4.0 | −1.6 | 1.1 | 3.9 | 6.7 | 9.0 | 9.9 | 9.0 | 6.7 | 3.9 |
| 8 | −3.0 | −0.2 | 3.0 | 6.7 | 11.0 | 15.0 | 17.0 | 15.0 | 11.0 | 6.7 |
| 9 | −2.3 | 0.7 | 4.4 | 9.0 | 15.0 | 23.0 | 29.0 | 23.0 | 15.0 | 9.0 |
| 10 | −2.1 | 1.1 | 4.9 | 9.9 | 17.0 | 29.0 | 97.9 | 29.0 | 17.0 | 9.9 |
| 11 | −2.3 | 0.7 | 4.4 | 9.0 | 15.0 | 23.0 | 29.0 | 23.0 | 15.0 | 9.0 |
| 12 | −3.0 | −0.2 | 3.0 | 6.7 | 11.0 | 15.0 | 17.0 | 15.0 | 11.0 | 6.7 |
| 13 | −4.0 | −1.6 | 1.1 | 3.9 | 6.7 | 9.0 | 9.9 | 9.0 | 6.7 | 3.9 |
| 14 | −5.3 | −3.2 | −1.1 | 1.1 | 3.0 | 4.4 | 4.9 | 4.4 | 3.0 | 1.1 |
| 15 | −6.7 | −5.0 | −3.2 | −1.6 | −0.2 | 0.7 | 1.1 | 0.7 | −0.2 | −1.6 |
| 16 | −8.1 | −6.7 | −5.3 | −4.0 | −3.0 | −2.3 | −2.1 | −2.3 | −3.0 | −4.0 |
| 17 | −9.6 | −8.4 | −7.2 | −6.2 | −5.5 | −5.0 | −4.8 | −5.0 | −5.5 | −6.2 |
| 18 | −11.0 | −10.0 | −9.0 | −8.2 | −7.6 | −7.2 | −7.1 | −7.2 | −7.6 | −8.2 |
| 19 | −12.3 | −11.5 | −10.7 | −10.1 | −9.6 | −9.3 | −9.1 | −9.3 | −9.6 | −10.1 |
| 20 | −13.7 | −12.9 | −12.3 | −11.7 | −11.3 | −11.1 | −11.0 | −11.1 | −11.3 | −11.7 |

| SINR k pre | 11 | 12 | 13 | 14 | 15 | 16 | 17 | 18 | 19 | 20 |
|---|---|---|---|---|---|---|---|---|---|---|
| 1 | −10.7 | −11.5 | −12.3 | −13.3 | −14.2 | −15.2 | −16.1 | −17.1 | −18.0 | −18.9 |
| 2 | −9.0 | −10.0 | −11.0 | −12.0 | −13.1 | −14.2 | −15.3 | −16.3 | −17.3 | −18.3 |
| 3 | −7.2 | −8.4 | −9.6 | −10.8 | −12.0 | −13.3 | −14.4 | −15.6 | −16.7 | −17.8 |
| 4 | −5.3 | −6.7 | −8.1 | −9.6 | −11.0 | −12.3 | −13.7 | −14.9 | −16.1 | −17.2 |
| 5 | −3.2 | −5.0 | −6.7 | −8.4 | −10.0 | −11.5 | −12.9 | −14.3 | −15.5 | −16.7 |
| 6 | −1.1 | −3.2 | −5.3 | −7.2 | −9.0 | −10.7 | −12.3 | −13.7 | −15.1 | −16.3 |
| 7 | 1.1 | −1.6 | −4.0 | −6.3 | −8.2 | −10.1 | −11.7 | −13.3 | −14.7 | −16.0 |
| 8 | 3.0 | −0.2 | −3.0 | −5.5 | −7.6 | −9.6 | −11.3 | −12.9 | −14.4 | −15.7 |
| 9 | 4.4 | 0.7 | −2.3 | −5.0 | −7.2 | −9.3 | −11.1 | −12.7 | −14.2 | −15.6 |
| 10 | 4.9 | 1.1 | −2.1 | −4.8 | −7.1 | −9.2 | −11.0 | −12.6 | −14.1 | −15.5 |
| 11 | 4.4 | 0.7 | −2.3 | −5.0 | −7.2 | −9.3 | −11.1 | −12.7 | −14.2 | −15.6 |
| 12 | 3.0 | −0.2 | −3.0 | −5.5 | −7.6 | −9.6 | −11.3 | −12.9 | −14.4 | −15.7 |
| 13 | 1.1 | −1.6 | −4.0 | −6.2 | −8.2 | −10.1 | −11.7 | −13.3 | −14.7 | −16.0 |
| 14 | −1.1 | −3.2 | −5.3 | −7.2 | −9.0 | −10.7 | −12.3 | −13.7 | −15.1 | −16.3 |
| 15 | −3.2 | −5.0 | −6.7 | −8.4 | −10.0 | −11.5 | −12.9 | −14.3 | −15.5 | −16.7 |
| 16 | −5.3 | −6.7 | −8.1 | −9.6 | −11.0 | −12.3 | −13.7 | −14.9 | −16.1 | −17.2 |
| 17 | −7.2 | −8.4 | −9.6 | −10.8 | −12.0 | −13.3 | −14.4 | −15.6 | −16.7 | −17.8 |
| 18 | −9.0 | −10.0 | −11.0 | −12.0 | −13.1 | −14.2 | −15.3 | −16.3 | −17.3 | −18.3 |
| 19 | −10.7 | −11.5 | −12.3 | −13.3 | −14.2 | −15.2 | −16.1 | −17.1 | −18.0 | −18.9 |
| 20 | −12.3 | −12.9 | −13.7 | −14.4 | −15.3 | −16.1 | −17.0 | −17.9 | −18.7 | −19.6 |

CBSD2 is requesting a grant in the same 10 MHz channel. CBSD2 is located at position (x=12, y=10.001), and it wants to transmit EIRP of 47 dBm/10 MHz. The signal for CBSD2 is represented in Table 4.

TABLE 4

CBSD2 signal

| Signal x | 1 | 2 | 3 | 4 | 5 | 6 | 7 | 8 | 9 | 10 |
|---|---|---|---|---|---|---|---|---|---|---|
| 1 | −111.6 | −110.6 | −109.6 | −108.7 | −107.7 | −106.8 | −106.0 | −105.2 | −104.5 | −104.0 |
| 2 | −110.8 | −109.7 | −108.7 | −107.6 | −106.5 | −105.4 | −104.4 | −103.5 | −102.7 | −102.1 |
| 3 | −110.1 | −108.9 | −107.7 | −106.5 | −105.3 | −104.0 | −102.8 | −101.7 | −100.7 | −99.9 |
| 4 | −109.4 | −108.1 | −106.8 | −105.4 | −104.0 | −102.6 | −101.2 | −99.8 | −98.5 | −97.5 |
| 5 | −108.7 | −107.4 | −105.9 | −104.4 | −102.8 | −101.2 | −99.4 | −97.7 | −96.1 | −94.7 |
| 6 | −108.2 | −106.7 | −105.2 | −103.5 | −101.7 | −99.8 | −97.7 | −95.5 | −93.4 | −91.5 |
| 7 | −107.7 | −106.2 | −104.5 | −102.7 | −100.7 | −98.5 | −96.1 | −93.4 | −90.6 | −87.7 |

TABLE 4-continued

| | | | | | CBSD2 signal | | | | | |
|---|---|---|---|---|---|---|---|---|---|---|
| 8 | −107.4 | −105.8 | −104.0 | −102.1 | −99.9 | −97.5 | −94.7 | −91.5 | −87.7 | −83.5 |
| 9 | −107.2 | −105.5 | −103.7 | −101.7 | −99.4 | −96.8 | −93.7 | −90.1 | −85.4 | −79.4 |
| 10 | −107.1 | −105.4 | −103.6 | −101.6 | −99.2 | −96.6 | −93.4 | −89.5 | −84.5 | −77.5 |
| 11 | −107.2 | −105.5 | −103.7 | −101.7 | −99.4 | −96.8 | −93.7 | −90.1 | −85.4 | −79.4 |
| 12 | −107.4 | −105.8 | −104.0 | −102.1 | −99.9 | −97.5 | −94.7 | −91.5 | −87.7 | −83.5 |
| 13 | −107.7 | −106.2 | −104.5 | −102.7 | −100.7 | −98.5 | −96.1 | −93.4 | −90.5 | −87.7 |
| 14 | −108.2 | −106.7 | −105.2 | −103.5 | −101.7 | −99.8 | −97.7 | −95.5 | −93.4 | −91.5 |
| 15 | −108.7 | −107.4 | −105.9 | −104.4 | −102.8 | −101.1 | −99.4 | −97.7 | −96.1 | −94.7 |
| 16 | −109.4 | −108.1 | −106.8 | −105.4 | −104.0 | −102.6 | −101.1 | −99.8 | −98.5 | −97.5 |
| 17 | −110.1 | −108.9 | −107.7 | −106.5 | −105.3 | −104.0 | −102.8 | −101.7 | −100.7 | −99.9 |
| 18 | −110.8 | −109.7 | −108.7 | −107.6 | −106.5 | −105.4 | −104.4 | −103.5 | −102.7 | −102.1 |
| 19 | −111.5 | −110.6 | −109.6 | −108.7 | −107.7 | −106.8 | −105.9 | −105.2 | −104.5 | −104.0 |
| 20 | −112.3 | −111.5 | −110.6 | −109.7 | −108.9 | −108.1 | −107.4 | −106.7 | −106.2 | −105.8 |

| Signal x | 11 | 12 | 13 | 14 | 15 | 16 | 17 | 18 | 19 | 20 |
|---|---|---|---|---|---|---|---|---|---|---|
| 1 | −103.7 | −103.6 | −103.7 | −104.0 | −104.5 | −105.2 | −106.0 | −106.8 | −107.7 | −108.7 |
| 2 | −101.7 | −101.6 | −101.7 | −102.1 | −102.7 | −103.5 | −104.4 | −105.4 | −106.5 | −107.6 |
| 3 | −99.4 | −99.2 | −99.4 | −99.9 | −100.7 | −101.7 | −102.8 | −104.0 | −105.3 | −106.5 |
| 4 | −96.8 | −96.6 | −96.8 | −97.5 | −98.5 | −99.8 | −101.2 | −102.6 | −104.0 | −105.4 |
| 5 | −93.7 | −93.4 | −93.7 | −94.7 | −96.1 | −97.7 | −99.4 | −101.2 | −102.8 | −104.4 |
| 6 | −90.1 | −89.5 | −90.1 | −91.5 | −93.4 | −95.5 | −97.7 | −99.8 | −101.7 | −103.5 |
| 7 | −85.4 | −84.5 | −85.4 | −87.7 | −90.6 | −93.4 | −96.1 | −98.5 | −100.7 | −102.7 |
| 8 | −79.4 | −77.5 | −79.4 | −83.5 | −87.7 | −91.5 | −94.7 | −97.5 | −99.9 | −102.1 |
| 9 | −71.5 | −65.5 | −71.5 | −79.4 | −85.4 | −90.1 | −93.7 | −96.8 | −99.4 | −101.7 |
| 10 | −65.4 | 3.4 | −65.4 | −77.5 | −84.5 | −89.5 | −93.4 | −96.6 | −99.2 | −101.6 |
| 11 | −71.5 | −65.4 | −71.5 | −79.4 | −85.4 | −90.1 | −93.7 | −96.8 | −99.4 | −101.7 |
| 12 | −79.4 | −77.5 | −79.4 | −83.5 | −87.7 | −91.5 | −94.7 | −97.5 | −99.9 | −102.1 |
| 13 | −85.4 | −84.5 | −85.4 | −87.7 | −90.5 | −93.4 | −96.1 | −98.5 | −100.7 | −102.7 |
| 14 | −90.0 | −89.5 | −90.0 | −91.5 | −93.4 | −95.5 | −97.7 | −99.8 | −101.7 | −103.5 |
| 15 | −93.7 | −93.4 | −93.7 | −94.7 | −96.1 | −97.7 | −99.4 | −101.2 | −102.8 | −104.4 |
| 16 | −96.8 | −96.6 | −96.8 | −97.5 | −98.5 | −99.8 | −101.1 | −102.6 | −104.0 | −105.4 |
| 17 | −99.4 | −99.2 | −99.4 | −99.9 | −100.7 | −101.7 | −102.8 | −104.0 | −105.3 | −106.5 |
| 18 | −101.7 | −101.6 | −101.7 | −102.1 | −102.7 | −103.5 | −104.4 | −105.4 | −106.5 | −107.6 |
| 19 | −103.7 | −103.6 | −103.7 | −104.0 | −104.5 | −105.2 | −105.9 | −106.8 | −107.7 | −108.7 |
| 20 | −105.5 | −105.4 | −105.5 | −105.8 | −106.2 | −106.7 | −107.4 | −108.1 | −108.9 | −109.7 |

The overlap between CBSD1 and CBSD2 coverage area is represented in Table 5 (0=no coverage, 1=CBSD1 coverage, 2=CBSD2 coverage, X=both CB and CBSD2 coverage).

TABLE 5

| | | | | | | Overlap between CBSD1 and CBSD2 coverage areas | | | | | | | | | | | | | | |
|---|---|---|---|---|---|---|---|---|---|---|---|---|---|---|---|---|---|---|---|---|
| Overlap | 1 | 2 | 3 | 4 | 5 | 6 | 7 | 8 | 9 | 10 | 11 | 12 | 13 | 14 | 15 | 16 | 17 | 18 | 19 | 20 |
| 1 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 1 | 1 | 1 | 1 | 1 | 2 | 2 | 2 | 2 | 2 | 0 | 0 | 0 | 0 | 0 | 0 |
| 6 | 0 | 0 | 1 | 1 | 1 | 1 | 1 | X | X | X | X | 2 | 2 | 2 | 2 | 0 | 0 | 0 | 0 | 0 |
| 7 | 0 | 0 | 1 | 1 | 1 | 1 | 1 | X | X | X | X | 2 | 2 | 2 | 2 | 0 | 0 | 0 | 0 | 0 |
| 8 | 0 | 1 | 1 | 1 | 1 | 1 | X | X | X | X | X | 2 | 2 | 2 | 2 | 2 | 0 | 0 | 0 | 0 |
| 9 | 0 | 1 | 1 | 1 | 1 | 1 | X | X | X | X | X | 2 | 2 | 2 | 2 | 2 | 0 | 0 | 0 | 0 |
| 10 | 0 | 1 | 1 | 1 | 1 | 1 | X | X | X | X | X | 2 | 2 | 2 | 2 | 2 | 0 | 0 | 0 | 0 |
| 11 | 0 | 1 | 1 | 1 | 1 | 1 | X | X | X | X | X | 2 | 2 | 2 | 2 | 2 | 0 | 0 | 0 | 0 |
| 12 | 0 | 1 | 1 | 1 | 1 | 1 | X | X | X | X | X | 2 | 2 | 2 | 2 | 2 | 0 | 0 | 0 | 0 |
| 13 | 0 | 0 | 1 | 1 | 1 | 1 | 1 | X | X | X | X | 2 | 2 | 2 | 2 | 0 | 0 | 0 | 0 | 0 |
| 14 | 0 | 0 | 1 | 1 | 1 | 1 | 1 | X | X | X | X | 2 | 2 | 2 | 2 | 0 | 0 | 0 | 0 | 0 |
| 15 | 0 | 0 | 0 | 0 | 1 | 1 | 1 | 1 | 1 | 2 | 2 | 2 | 2 | 2 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 | 0 | 0 | 0 | 0 |
| 17 | 0 | 0 | 0 | 0 | 0 | 0 | 0 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 | 0 | 0 | 0 | 0 | 0 | 0 | 0 |
| 19 | 0 | 0 | 0 | 0 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 | 0 | 0 | 0 | 0 |

Tables 6 and 7 show the SINK for CBSD1 and CBSD2 after the CBSD2 introduction, respectively.

TABLE 6

CBSD1 SINR post CBSD2 introduction.

| SINR k post | 1 | 2 | 3 | 4 | 5 | 6 | 7 | 8 | 9 | 10 |
|---|---|---|---|---|---|---|---|---|---|---|
| 1 | −12.5 | −11.7 | −11.0 | −10.4 | −10.0 | −9.7 | −9.7 | −9.9 | −10.4 | −10.9 |
| 2 | −11.2 | −10.2 | −9.4 | −8.7 | −8.1 | −7.9 | −7.9 | −8.2 | −8.8 | −9.5 |
| 3 | −9.8 | −8.7 | −7.6 | −6.8 | −6.1 | −5.8 | −5.9 | −6.4 | −7.2 | −8.2 |
| 4 | −8.4 | −7.0 | −5.8 | −4.7 | −3.9 | −3.5 | −3.7 | −4.4 | −5.5 | −7.0 |
| 5 | −7.0 | −5.4 | −3.8 | −2.4 | −1.3 | −0.8 | −1.1 | −2.2 | −4.0 | −6.2 |
| 6 | −5.7 | −3.7 | −1.8 | 0.1 | 1.6 | 2.4 | 2.0 | 0.3 | −2.5 | −5.9 |
| 7 | −4.4 | −2.2 | 0.3 | 2.8 | 5.1 | 6.5 | 6.2 | 3.5 | −1.0 | −6.3 |
| 8 | −3.4 | −0.8 | 2.1 | 5.5 | 9.0 | 12.0 | 12.4 | 8.1 | 0.8 | −7.4 |
| 9 | −2.8 | 0.1 | 3.5 | 7.6 | 12.9 | 19.6 | 23.7 | 14.9 | 2.8 | −9.1 |
| 10 | −2.6 | 0.4 | 4.0 | 8.5 | 14.8 | 25.5 | 92.4 | 20.4 | 3.8 | −10.1 |
| 11 | −2.8 | 0.1 | 3.5 | 7.6 | 12.9 | 19.7 | 23.8 | 14.9 | 2.8 | −9.1 |
| 12 | −3.4 | −0.8 | 2.1 | 5.5 | 9.0 | 12.0 | 12.4 | 8.1 | 0.8 | −7.4 |
| 13 | −4.4 | −2.2 | 0.3 | 2.8 | 5.1 | 6.5 | 6.2 | 3.5 | −1.0 | −6.3 |
| 14 | −5.7 | −3.7 | −1.8 | 0.1 | 1.6 | 2.4 | 2.0 | 0.3 | −2.5 | −5.9 |
| 15 | −7.0 | −5.4 | −3.8 | −2.4 | −1.3 | −0.8 | −1.1 | −2.2 | −4.0 | −6.2 |
| 16 | −8.4 | −7.0 | −5.8 | −4.7 | −3.9 | −3.5 | −3.7 | −4.4 | −5.5 | −7.0 |
| 17 | −9.8 | −8.7 | −7.6 | −6.8 | −6.1 | −5.8 | −5.9 | −6.3 | −7.1 | −8.2 |
| 18 | −11.2 | −10.2 | −9.4 | −8.6 | −8.1 | −7.9 | −7.9 | −8.2 | −8.8 | −9.5 |
| 19 | −12.5 | −11.7 | −11.0 | −10.4 | −10.0 | −9.7 | −9.7 | −9.9 | −10.3 | −10.9 |
| 20 | −13.8 | −13.1 | −12.5 | −12.0 | −11.6 | −11.4 | −11.4 | −11.6 | −11.9 | −12.3 |

| SINR k post | 11 | 12 | 13 | 14 | 15 | 16 | 17 | 18 | 19 | 20 |
|---|---|---|---|---|---|---|---|---|---|---|
| 1 | −11.6 | −12.4 | −13.3 | −14.1 | −15.0 | −15.9 | −16.7 | −17.6 | −18.4 | −19.3 |
| 2 | −10.4 | −11.4 | −12.4 | −13.3 | −14.3 | −15.2 | −16.1 | −17.0 | −17.9 | −18.7 |
| 3 | −9.4 | −10.6 | −11.7 | −12.8 | −13.7 | −14.6 | −15.6 | −16.5 | −17.4 | −18.3 |
| 4 | −8.7 | −10.2 | −11.5 | −12.6 | −13.5 | −14.4 | −15.2 | −16.1 | −17.0 | −17.9 |
| 5 | −8.5 | −10.5 | −11.9 | −13.0 | −13.7 | −14.4 | −15.1 | −15.8 | −16.6 | −17.5 |
| 6 | −9.2 | −11.8 | −13.4 | −14.2 | −14.5 | −14.8 | −15.2 | −15.7 | −16.5 | −17.3 |
| 7 | −11.2 | −14.8 | −16.3 | −16.4 | −16.0 | −15.6 | −15.5 | −15.8 | −16.4 | −17.1 |
| 8 | −15.1 | −20.2 | −21.1 | −19.6 | −17.8 | −16.5 | −15.9 | −15.9 | −16.3 | −17.0 |
| 9 | −21.6 | −31.3 | −28.3 | −23.1 | −19.5 | −17.4 | −16.3 | −16.1 | −16.3 | −17.0 |
| 10 | −27.1 | −99.8 | −34.1 | −24.8 | −20.3 | −17.7 | −16.5 | −16.1 | −16.4 | −17.0 |
| 11 | −21.6 | −31.3 | −28.4 | −23.1 | −19.5 | −17.4 | −16.3 | −16.1 | −16.3 | −17.0 |
| 12 | −15.1 | −20.3 | −21.1 | −19.6 | −17.8 | −16.5 | −15.9 | −15.9 | −16.3 | −17.0 |
| 13 | −11.2 | −14.8 | −16.3 | −16.4 | −16.0 | −15.6 | −15.5 | −15.8 | −16.4 | −17.1 |
| 14 | −9.2 | −11.8 | −13.4 | −14.2 | −14.5 | −14.8 | −15.2 | −15.7 | −16.5 | −17.3 |
| 15 | −8.5 | −10.5 | −11.9 | −13.0 | −13.7 | −14.4 | −15.1 | −15.8 | −16.6 | −17.5 |
| 16 | −8.7 | −10.2 | −11.5 | −12.6 | −13.5 | −14.4 | −15.2 | −16.1 | −17.0 | −17.9 |
| 17 | −9.4 | −10.6 | −11.7 | −12.8 | −13.7 | −14.6 | −15.6 | −16.5 | −17.4 | −18.3 |
| 18 | −10.4 | −11.4 | −12.4 | −13.3 | −14.3 | −15.2 | −16.1 | −17.0 | −17.9 | −18.7 |
| 19 | −11.6 | −12.4 | −13.3 | −14.1 | −15.0 | −15.8 | −16.7 | −17.6 | −18.4 | −19.3 |
| 20 | −12.9 | −13.6 | −14.3 | −15.0 | −15.8 | −16.6 | −17.4 | −18.2 | −19.0 | −19.8 |

TABLE 7

CBSD2 SINR post CBSD2 introduction

| SINR x post | 1 | 2 | 3 | 4 | 5 | 6 | 7 | 8 | 9 | 10 |
|---|---|---|---|---|---|---|---|---|---|---|
| 1 | −17.6 | −16.7 | −15.9 | −15.0 | −14.1 | −13.3 | −12.4 | −11.6 | −10.9 | −10.4 |
| 2 | −17.0 | −16.1 | −15.2 | −14.3 | −13.3 | −12.4 | −11.4 | −10.4 | −9.5 | −8.8 |
| 3 | −16.5 | −15.6 | −14.6 | −13.7 | −12.8 | −11.7 | −10.6 | −9.4 | −8.2 | −7.2 |
| 4 | −16.1 | −15.2 | −14.4 | −13.5 | −12.6 | −11.5 | −10.2 | −8.7 | −7.0 | −5.5 |
| 5 | −15.8 | −15.1 | −14.4 | −13.7 | −13.0 | −11.9 | −10.5 | −8.5 | −6.2 | −4.0 |
| 6 | −15.7 | −15.2 | −14.8 | −14.5 | −14.2 | −13.4 | −11.8 | −9.2 | −5.9 | −2.5 |
| 7 | −15.8 | −15.5 | −15.6 | −16.0 | −16.4 | −16.3 | −14.8 | −11.2 | −6.3 | −1.0 |
| 8 | −15.9 | −15.9 | −16.5 | −17.8 | −19.6 | −21.1 | −20.2 | −15.1 | −7.4 | 0.8 |
| 9 | −16.1 | −16.3 | −17.4 | −19.5 | −23.1 | −28.3 | −31.3 | −21.6 | −9.1 | 2.8 |
| 10 | −16.1 | −16.5 | −17.7 | −20.3 | −24.8 | −34.1 | −99.8 | −27.1 | −10.1 | 3.8 |
| 11 | −16.1 | −16.3 | −17.4 | −19.5 | −23.1 | −28.4 | −31.3 | −21.6 | −9.1 | 2.8 |
| 12 | −15.9 | −15.9 | −16.5 | −17.8 | −19.6 | −21.1 | −20.3 | −15.1 | −7.4 | 0.8 |
| 13 | −15.8 | −15.5 | −15.6 | −16.0 | −16.4 | −16.3 | −14.8 | −11.2 | −6.3 | −1.0 |
| 14 | −15.7 | −15.2 | −14.8 | −14.5 | −14.2 | −13.4 | −11.8 | −9.2 | −5.9 | −2.5 |
| 15 | −15.8 | −15.1 | −14.4 | −13.7 | −13.0 | −11.9 | −10.5 | −8.5 | −6.2 | −4.0 |
| 16 | −16.1 | −15.2 | −14.4 | −13.5 | −12.6 | −11.5 | −10.2 | −8.7 | −7.0 | −5.5 |
| 17 | −16.5 | −15.6 | −14.6 | −13.7 | −12.8 | −11.7 | −10.6 | −9.4 | −8.2 | −7.1 |
| 18 | −17.0 | −16.1 | −15.2 | −14.3 | −13.3 | −12.4 | −11.4 | −10.4 | −9.5 | −8.8 |
| 19 | −17.6 | −16.7 | −15.8 | −15.0 | −14.1 | −13.3 | −12.4 | −11.6 | −10.9 | −10.3 |
| 20 | −18.2 | −17.4 | −16.6 | −15.8 | −15.0 | −14.3 | −13.6 | −12.9 | −12.3 | −11.9 |

TABLE 7-continued

| | CBSD2 SINR post CBSD2 introduction | | | | | | | | | |
|---|---|---|---|---|---|---|---|---|---|---|
| SINR x post | 11 | 12 | 13 | 14 | 15 | 16 | 17 | 18 | 19 | 20 |
| 1 | −9.9 | −9.7 | −9.7 | −10.0 | −10.4 | −11.0 | −11.7 | −12.5 | −13.4 | −14.3 |
| 2 | −8.2 | −7.9 | −7.9 | −8.1 | −8.7 | −9.4 | −10.2 | −11.2 | −12.2 | −13.3 |
| 3 | −6.4 | −5.9 | −5.8 | −6.1 | −6.8 | −7.6 | −8.7 | −9.8 | −11.0 | −12.2 |
| 4 | −4.4 | −3.7 | −3.5 | −3.9 | −4.7 | −5.8 | −7.0 | −8.4 | −9.8 | −11.1 |
| 5 | −2.2 | −1.1 | −0.8 | −1.3 | −2.4 | −3.8 | −5.4 | −7.0 | −8.6 | −10.2 |
| 6 | 0.3 | 2.0 | 2.4 | 1.6 | 0.1 | −1.8 | −3.7 | −5.7 | −7.5 | −9.2 |
| 7 | 3.5 | 6.2 | 6.5 | 5.1 | 2.8 | 0.3 | −2.2 | −4.4 | −6.5 | −8.5 |
| 8 | 8.1 | 12.4 | 12.0 | 9.0 | 5.5 | 2.1 | −0.8 | −3.4 | −5.8 | −7.9 |
| 9 | 14.9 | 23.7 | 19.6 | 12.9 | 7.6 | 3.5 | 0.1 | −2.8 | −5.3 | −7.5 |
| 10 | 20.4 | 92.4 | 25.5 | 14.8 | 8.5 | 4.0 | 0.4 | −2.6 | −5.1 | −7.3 |
| 11 | 14.9 | 23.8 | 19.7 | 12.9 | 7.6 | 3.5 | 0.1 | −2.8 | −5.3 | −7.5 |
| 12 | 8.1 | 12.4 | 12.0 | 9.0 | 5.5 | 2.1 | −0.8 | −3.4 | −5.8 | −7.9 |
| 13 | 3.5 | 6.2 | 6.5 | 5.1 | 2.8 | 0.3 | −2.2 | −4.4 | −6.5 | −8.5 |
| 14 | 0.3 | 2.0 | 2.4 | 1.6 | 0.1 | −1.8 | −3.7 | −5.7 | −7.5 | −9.2 |
| 15 | −2.2 | −1.1 | −0.8 | −1.3 | −2.4 | −3.8 | −5.4 | −7.0 | −8.6 | −10.1 |
| 16 | −4.4 | −3.7 | −3.5 | −3.9 | −4.7 | −5.8 | −7.0 | −8.4 | −9.8 | −11.1 |
| 17 | −6.3 | −5.9 | −5.8 | −6.1 | −6.8 | −7.6 | −8.7 | −9.8 | −11.0 | −12.2 |
| 18 | −8.2 | −7.9 | −7.9 | −8.1 | −8.6 | −9.4 | −10.2 | −11.2 | −12.2 | −13.3 |
| 19 | −9.9 | −9.7 | −9.7 | −10.0 | −10.4 | −11.0 | −11.7 | −12.5 | −13.4 | −14.3 |
| 20 | −11.6 | −11.4 | −11.4 | −11.6 | −12.0 | −12.5 | −13.1 | −13.8 | −14.6 | −15.4 |

The Relative User Value (RUV) impact for CBSD1 is shown in Table 8. The Average relative user impact for CBSD1 over the coverage area of CBSD2 is $ARUV_1 = -6.46$.

TABLE 8

| | RUV for CBSD1 | | | | | | | | | | | | | | | | | | | |
|---|---|---|---|---|---|---|---|---|---|---|---|---|---|---|---|---|---|---|---|---|
| RUV k | 1 | 2 | 3 | 4 | 5 | 6 | 7 | 8 | 9 | 10 | 11 | 12 | 13 | 14 | 15 | 16 | 17 | 18 | 19 | 20 |
| 1 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | −4.071 | −5.496 | −6.969 | −8.13 | 0 | 0 | 0 | 0 | 0 | 0 | 0 | 0 | 0 |
| 7 | 0 | 0 | 0 | 0 | 0 | 0 | 0 | −5.497 | −7.715 | −10.17 | −12.28 | 0 | 0 | 0 | 0 | 0 | 0 | 0 | 0 | 0 |
| 8 | 0 | 0 | 0 | 0 | 0 | 0 | −4.612 | −6.97 | −10.18 | −14.12 | −18.1 | −20.01 | 0 | 0 | 0 | 0 | 0 | 0 | 0 | 0 |
| 9 | 0 | 0 | 0 | 0 | 0 | 0 | −5.256 | −8.133 | −12.28 | −18.1 | −26 | −32 | 0 | 0 | 0 | 0 | 0 | 0 | 0 | 0 |
| 10 | 0 | 0 | 0 | 0 | 0 | 0 | −5.498 | −8.584 | −13.15 | −20.02 | −32.02 | −100.9 | 0 | 0 | 0 | 0 | 0 | 0 | 0 | 0 |
| 11 | 0 | 0 | 0 | 0 | 0 | 0 | −5.257 | −8.135 | −12.28 | −18.11 | −26.02 | −32.04 | 0 | 0 | 0 | 0 | 0 | 0 | 0 | 0 |
| 12 | 0 | 0 | 0 | 0 | 0 | 0 | −4.614 | −6.973 | −10.18 | −14.13 | −18.11 | −20.03 | 0 | 0 | 0 | 0 | 0 | 0 | 0 | 0 |
| 13 | 0 | 0 | 0 | 0 | 0 | 0 | 0 | −5.5 | −7.72 | −10.18 | −12.29 | 0 | 0 | 0 | 0 | 0 | 0 | 0 | 0 | 0 |
| 14 | 0 | 0 | 0 | 0 | 0 | 0 | 0 | −4.074 | −5.5 | −6.974 | −8.137 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 | 0 | 0 | 0 | 0 |
| 17 | 0 | 0 | 0 | 0 | 0 | 0 | 0 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 | 0 | 0 | 0 | 0 | 0 | 0 | 0 |
| 19 | 0 | 0 | 0 | 0 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 | 0 | 0 | 0 | 0 |

The Relative User Value (RUV) of CBSD2 is shown in Table 9. The Average relative user impact for CBSD2 over the coverage area of CBSD2 is $ARUV_2 = 4.96$.

TABLE 9

| | RUV for CBSD2 | | | | | | | | | | |
|---|---|---|---|---|---|---|---|---|---|---|---|
| RUV x | 1 | 2 | 3 | 4 | 5 | 6 | 7 | 8 | 9 | 10 | 11 |
| 1 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 |
| 5 | 0 | 0 | 0 | 0 | 0 | 0 | 0 | 0 | 0 | −3.991 | −2.177 |
| 6 | 0 | 0 | 0 | 0 | 0 | 0 | 0 | −9.217 | −5.912 | −2.502 | 0.334 |
| 7 | 0 | 0 | 0 | 0 | 0 | 0 | 0 | −11.22 | −6.264 | −0.98 | 3.517 |
| 8 | 0 | 0 | 0 | 0 | 0 | 0 | −20.24 | −15.1 | −7.387 | 0.777 | 8.062 |
| 9 | 0 | 0 | 0 | 0 | 0 | 0 | −31.29 | −21.59 | −9.087 | 2.754 | 14.86 |

TABLE 9-continued

| | | | | | | | RUV for CBSD2 | | | | |
|---|---|---|---|---|---|---|---|---|---|---|---|
| 10 | 0 | 0 | 0 | 0 | 0 | 0 | −99.83 | −27.09 | −10.09 | 3.828 | 20.43 |
| 11 | 0 | 0 | 0 | 0 | 0 | 0 | −31.32 | −21.61 | −9.09 | 2.758 | 14.87 |
| 12 | 0 | 0 | 0 | 0 | 0 | 0 | −20.26 | −15.11 | −7.39 | 0.781 | 8.073 |
| 13 | 0 | 0 | 0 | 0 | 0 | 0 | 0 | −11.23 | −6.266 | −0.977 | 3.524 |
| 14 | 0 | 0 | 0 | 0 | 0 | 0 | 0 | −9.22 | −5.912 | −2.499 | 0.339 |
| 15 | 0 | 0 | 0 | 0 | 0 | 0 | 0 | 0 | 0 | −3.988 | −2.172 |
| 16 | 0 | 0 | 0 | 0 | 0 | 0 | 0 | 0 | 0 | 0 | 0 |
| 17 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 |
| 19 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 |

| RUV x | 12 | 13 | 14 | 15 | 16 | 17 | 18 | 19 | 20 |
|---|---|---|---|---|---|---|---|---|---|
| 1 | 0 | 0 | 0 | 0 | 0 | 0 | 0 | 0 | 0 |
| 2 | 0 | 0 | 0 | 0 | 0 | 0 | 0 | 0 | 0 |
| 3 | 0 | 0 | 0 | 0 | 0 | 0 | 0 | 0 | 0 |
| 4 | 0 | 0 | 0 | 0 | 0 | 0 | 0 | 0 | 0 |
| 5 | −1.083 | −0.831 | −1.34 | 0 | 0 | 0 | 0 | 0 | 0 |
| 6 | 2.039 | 2.396 | 1.606 | 0.092 | −1.765 | 0 | 0 | 0 | 0 |
| 7 | 6.169 | 6.495 | 5.053 | 2.775 | 0.278 | 0 | 0 | 0 | 0 |
| 8 | 12.36 | 12.03 | 9.003 | 5.452 | 2.131 | −0.827 | 0 | 0 | 0 |
| 9 | 23.75 | 19.64 | 12.9 | 7.628 | 3.486 | 0.089 | 0 | 0 | 0 |
| 10 | 92.4 | 25.54 | 14.77 | 8.508 | 3.993 | 0.418 | 0 | 0 | 0 |
| 11 | 23.78 | 19.66 | 12.9 | 7.632 | 3.488 | 0.09 | 0 | 0 | 0 |
| 12 | 12.37 | 12.05 | 9.011 | 5.457 | 2.135 | −0.825 | 0 | 0 | 0 |
| 13 | 6.178 | 6.504 | 5.061 | 2.781 | 0.282 | 0 | 0 | 0 | 0 |
| 14 | 2.046 | 2.403 | 1.612 | 0.098 | −1.761 | 0 | 0 | 0 | 0 |
| 15 | −1.077 | −0.825 | −1.335 | 0 | 0 | 0 | 0 | 0 | 0 |
| 16 | 0 | 0 | 0 | 0 | 0 | 0 | 0 | 0 | 0 |
| 17 | 0 | 0 | 0 | 0 | 0 | 0 | 0 | 0 | 0 |
| 18 | 0 | 0 | 0 | 0 | 0 | 0 | 0 | 0 | 0 |
| 19 | 0 | 0 | 0 | 0 | 0 | 0 | 0 | 0 | 0 |
| 20 | 0 | 0 | 0 | 0 | 0 | 0 | 0 | 0 | 0 |

The Sum of relative user values ARUV1+ARUV2=−1.46 and the grant for CBSD2 will not be approved since the Sum of Average Relative User Value (SARUV) is negative.

However, if both the EIRP for CBSD1 and CBSD2 would be decreased by 3 dB, to 44 dBm/10 MHz (see Table 10 for the new overlap area), then the ARUV1=−3.95 and ARUV2=6.03, and the sum of relative user value (SARUV) is SARUV=2.07, which would allow the CBSD2 grant to be approved.

TABLE 10

New overlap between CBSD1 and CBSD2 coverage areas when EIRP has been reduced by 3 dB.

| Overlap | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 1 | 0 | 0 | 0 | 0 | 0 | 0 | 0 | 0 | 3 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 1 | 1 | 1 | 1 | 1 | 2 | 2 | 2 | 2 | 2 | 0 | 0 | 0 | 0 | 0 | 0 |
| 7 | 0 | 0 | 0 | 1 | 1 | 1 | 1 | 1 | X | X | 2 | 2 | 2 | 2 | 2 | 0 | 0 | 0 | 0 | 0 |
| 8 | 0 | 0 | 1 | 1 | 1 | 1 | 1 | X | X | X | X | 2 | 2 | 2 | 2 | 0 | 0 | 0 | 0 | 0 |
| 9 | 0 | 0 | 1 | 1 | 1 | 1 | 1 | X | X | X | X | 2 | 2 | 2 | 2 | 0 | 0 | 0 | 0 | 0 |
| 10 | 0 | 0 | 1 | 1 | 1 | 1 | 1 | X | X | X | X | 2 | 2 | 2 | 2 | 0 | 0 | 0 | 0 | 0 |
| 11 | 0 | 0 | 1 | 1 | 1 | 1 | 1 | X | X | X | X | 2 | 2 | 2 | 2 | 0 | 0 | 0 | 0 | 0 |
| 12 | 0 | 0 | 1 | 1 | 1 | 1 | 1 | X | X | X | X | 2 | 2 | 2 | 2 | 0 | 0 | 0 | 0 | 0 |
| 13 | 0 | 0 | 0 | 1 | 1 | 1 | 1 | 1 | X | X | 2 | 2 | 2 | 2 | 0 | 0 | 0 | 0 | 0 | 0 |
| 14 | 0 | 0 | 0 | 0 | 1 | 1 | 1 | 1 | 1 | 2 | 2 | 2 | 2 | 2 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 | 0 | 0 | 0 | 0 |
| 17 | 0 | 0 | 0 | 0 | 0 | 0 | 0 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 | 0 | 0 | 0 | 0 | 0 | 0 | 0 |
| 19 | 0 | 0 | 0 | 0 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 | 0 | 0 | 0 | 0 |

The grant could have also been approved with SARUV=1.67, if the CBSD2 would be moved one unit to the right, see Table 11.

TABLE 11

New overlap between CBSD1 and CBSD2 coverage areas when CBSD is moved one unit to the right

| Overlap | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 1 | 1 | 1 | 1 | 1 | 0 | 2 | 2 | 2 | 2 | 2 | 0 | 0 | 0 | 0 | 0 |
| 6 | 0 | 0 | 1 | 1 | 1 | 1 | 1 | 1 | X | X | X | 2 | 2 | 2 | 2 | 2 | 2 | 0 | 0 | 0 |
| 7 | 0 | 0 | 1 | 1 | 1 | 1 | 1 | 1 | X | X | X | 2 | 2 | 2 | 2 | 2 | 2 | 0 | 0 | 0 |
| 8 | 0 | 1 | 1 | 1 | 1 | 1 | 1 | X | X | X | X | X | 2 | 2 | 2 | 2 | 2 | 2 | 0 | 0 |
| 9 | 0 | 1 | 1 | 1 | 1 | 1 | 1 | X | X | X | X | X | 2 | 2 | 2 | 2 | 2 | 2 | 0 | 0 |
| 10 | 0 | 1 | 1 | 1 | 1 | 1 | 1 | X | X | X | X | X | 2 | 2 | 2 | 2 | 2 | 2 | 0 | 0 |
| 11 | 0 | 1 | 1 | 1 | 1 | 1 | 1 | X | X | X | X | X | 2 | 2 | 2 | 2 | 2 | 2 | 0 | 0 |
| 12 | 0 | 1 | 1 | 1 | 1 | 1 | 1 | X | X | X | X | X | 2 | 2 | 2 | 2 | 2 | 2 | 0 | 0 |
| 13 | 0 | 0 | 1 | 1 | 1 | 1 | 1 | 1 | X | X | X | 2 | 2 | 2 | 2 | 2 | 2 | 0 | 0 | 0 |
| 14 | 0 | 0 | 1 | 1 | 1 | 1 | 1 | 1 | X | X | X | 2 | 2 | 2 | 2 | 2 | 2 | 0 | 0 | 0 |
| 15 | 0 | 0 | 0 | 0 | 1 | 1 | 1 | 1 | 1 | 0 | 2 | 2 | 2 | 2 | 2 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 | 0 | 0 | 0 | 0 |
| 17 | 0 | 0 | 0 | 0 | 0 | 0 | 0 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 | 0 | 0 | 0 | 0 | 0 | 0 | 0 |
| 19 | 0 | 0 | 0 | 0 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 | 0 | 0 | 0 | 0 |

Figure 7:
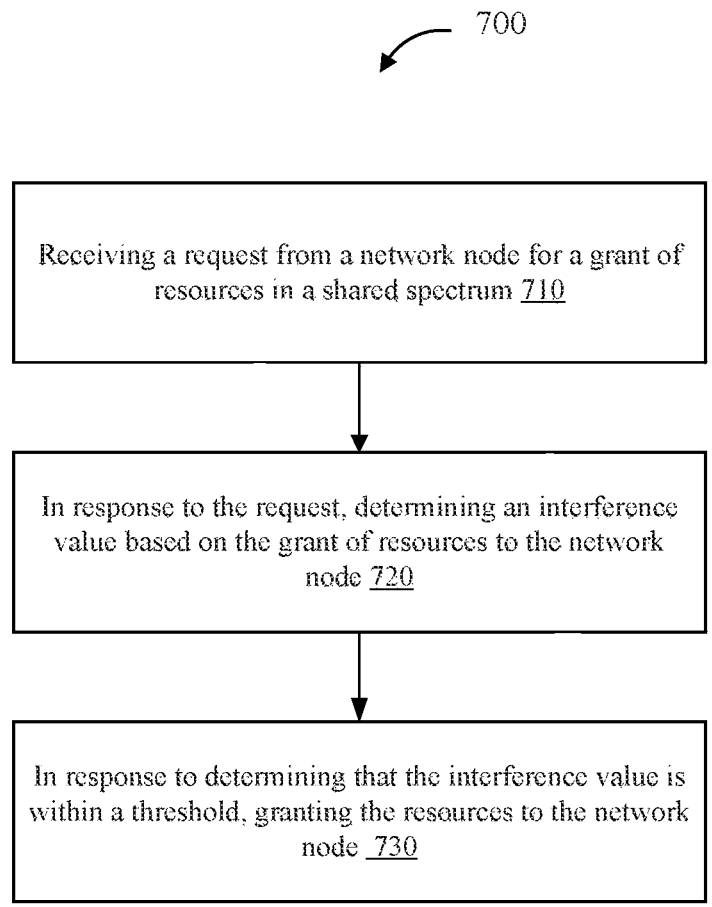
FIG. 7 is a flowchart of a method in a controlling node, according to an embodiment.

FIG. 7 illustrates some embodiments of methods in a controlling node, such as SAS1, for granting resources to network nodes, in accordance with a first aspect of the present disclosure.

Some embodiments of the method 700 according to this aspect comprise the following steps:

Step 710: receiving a request from a network node for a grant of resources in a shared spectrum;

Step 720: in response to the request, determining an interference value based on the grant of resources to the network node; and Step 730: in response to determining that the interference value satisfies a threshold, granting the recourses to the network node.

The network node is for example a CBSD.

The interference value is determined through the user value function and the evaluation grid, as described above. For example, the SAS will calculate an average relative user value, in the coverage area of the CBSD before it is granted services and after the CBSD is granted services. If the average relative user value is equal or superior to a threshold (Th), i.e. the interference value satisfies this threshold, then the CBSD is granted services or resources, i.e. it is allowed to transmit data. In other words, the CBSD grant request is approved if the positive effects of introducing the CBSD surpasses the negative impact.

It should be noted that the user value for a location (e.g. pixel) reflects the "service" value that the user will receive from a CBSD.

As the SAS accepts or rejects grant requests from CBSDs based on the interference value, it creates or designs clusters or groups of cells and/or eNBs (or network nodes) in the system. The clusters of network nodes are created based on the determined interference value, using the relative user value, for example.

Once those clusters are created, embodiments of the present disclosure also allow the SAS to mitigate interference between nodes, for example, inter-clusters and/or intra-clusters.

Methods to Mitigate Interference Between Network Nodes in Shared Spectrum

In general, the SAS manages interference to incumbents by Tiers 2 and 3, interference among Tier 2 devices, and interference from Tier 3 into Tier 2. Embodiments of the present disclosure also provide for mitigating interference between clusters and within clusters.

Figure 8:
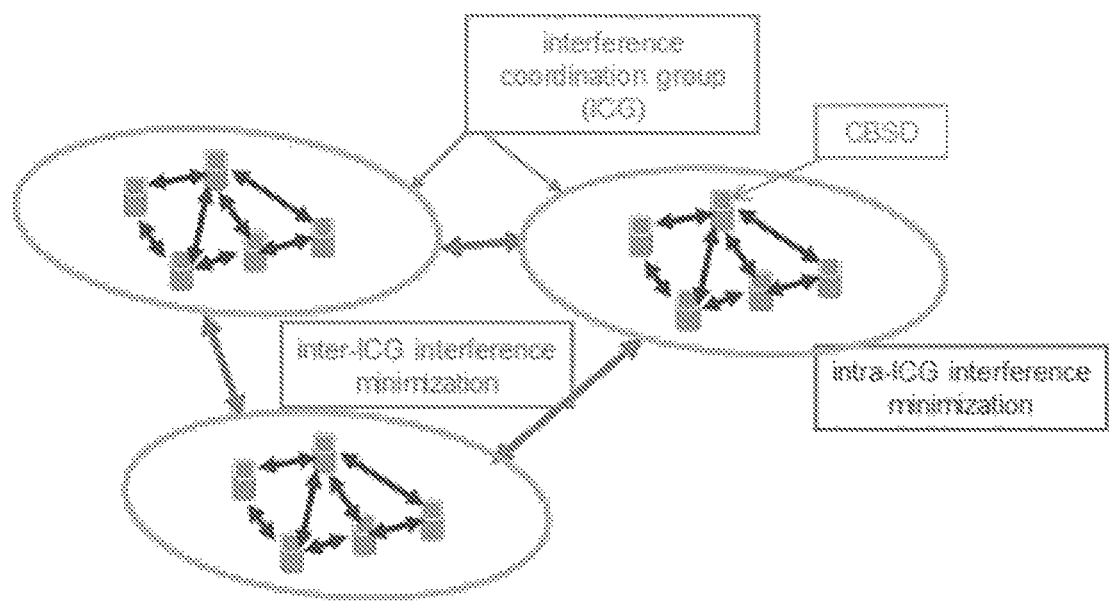
FIG. 8 is a schematic illustration of inter-cluster (or inter-Interference Coordination Group (ICG)) versus intra-cluster (or intra-ICG) interference.

In order to mitigate the level of interference seen by network nodes or groups of network nodes of the same or differing radio access technologies (RATs) in a shared spectrum deployment, the network nodes can be divided into clusters, such as interference coordination groups (ICGs) and one or more of the following interference mitigation or reduction methods can be applied intra-group (i.e. within the interference coordination group or within the cluster) or inter-group (i.e. between the interference coordination groups or between clusters). The conceptual notions of intra-ICG and inter-ICG are illustrated in FIG. 8.

The different methods for mitigating the interference level are given below:

a) Interference alignment (IA): IA is a method in which one or more network nodes in a first group or cluster of network nodes cooperate to transmit their signals such that the interference falls onto one or more dimensions that can be orthogonalized by a network node that would potentially be interfered with by the network nodes in the first group or cluster, see [V. Cadambe and S. Jafar, "Interference Alignment and Degrees of Freedom of the K-User Interference Channel", IEEE Transactions on Information Theory, Vol 54, No. 8, August 2008, pp 3425-3441], and [K. Gomadam, V. Cadambe and S. Jafar, "A Distributed Numerical Approach to Interference Alignment and Applications to Wireless Interference Networks", IEEE Transactions on Information Theory, Vol 57, No. 6, June 2011, pp 3309-3322].

b) Active antenna systems (AAS): AAS implementations at each CBSD can be optimized according to a number of criteria to minimize interference within (intra) an interference coordination group (ICG), or between (inter) interference coordination groups. The optimization approaches can include known approaches such as IRC (interference rejection combining) or max SINR algorithms, see [D Schmidt et al. "Comparison of Distributed Beamforming Algorithms for MIMO Interference Networks", "IEEE Transactions on Signal Processing, Vol 61, No 13, July 2013].

c) IA plus AAS: AAS and IA can be applied both intra-ICG or inter-ICG or in combinations as listed below:

i) AAS Optimized to Minimize Interference Both Intra-ICG and Inter-ICG:

In this method, a first set of AAS precoding beam weights $W_{k,i}^1$ are optimized to minimize the intra-ICG interference (i.e. the interference between CBSDs within an ICG) for the kth CBSD in ICG "i". Note that the optimization of this first set of precoding weights between different ICGs can be carried out independently. A second set of precoding weights $W^2_i$ is then applied to transmissions from CBSDs that are optimized to minimize the interference between ICGs. The resulting precoding weight for the kth CBSD in the ith ICG is thus $W^2_i \times W_{k,i}^1$. Note that for CBSDs with N antennas the span of vectors $W^2_i$ and $W_{k,i}^1$ is "N".

ii) IA Optimized to Minimize Interference Both Intra-ICG and Inter-ICG:

In this method, IA is applied independently to CBSDs within each ICG to minimize interference within the ICG. Subsequently a second tier of IA is applied between ICGs to minimize interference between ICGs. For the implementation of the second tier IA, each ICG is treated as a single virtual network node or device from an IA perspective.

iii) IA Optimized Intra-ICG and AAS Optimized Inter-ICG:

In this method, IA is applied independently to CBSDs within each ICG to minimize interference within the ICG. Subsequently precoding weights $W^2_i$ are then applied to CDSDs in ICG "I" that are optimized to minimize the interference between ICGs.

iv) AAS Optimized Intra-ICG and IA Optimized Inter-ICG:

In this method, a first set of AAS precoding beam weights $W_{k,i}^1$ are optimized to minimize the intra-ICG interference (i.e. the interference between CBSDs within and ICG) for the kth CBSD in ICG "i". Note that the optimization of this first set of precoding weights between different ICGs can be carried out independently. Subsequently a second tier of IA is applied between ICGs to minimize interference between ICGs. For the implementation of the second tier IA, each ICG is treated as a single virtual network node or device from an IA perspective.

SAS Assisted Methods to Mitigate Interference Between Network Nodes in Shared Spectrum The above-described mitigation methods assume that the intra and inter-ICG coordination is managed within a given RAT technology in a centralized manner by a master network node, or in a distributed manner by one or more CBSDs. An additional method of mitigating interference is by having the SAS initiate a session based interface between the devices within an ICG or between groups of devices (i.e. ICGs) desiring coordination to create ICIC or ICG group coordination between ICG groups from the same or differing RAT networks. The information exchanged over the interface can be indications of the interference between devices within an ICG as well as between ICGs, or loading on specific resource blocks as well as traffic information on a time-averaged basis. The indications of interferences are determined according to the methods as described above, such as IA, AAS, and IA plus AAS. The intent here is for the interface to be relatively low bandwidth and augmented by event logging of outages that can be aggregated and exchanged. A variation of this approach involves multiple SASs receiving information from multiple ICGs as above and the SASs exchanging information between themselves to facilitate optimization of the ICIC.

In other words, when the SAS mitigates interference between clusters of network nodes and within a cluster of network nodes, the SAS calculates interference mitigation parameters using Interference Alignment (IA), Active Antenna System (AAS) and/or IA plus AAS. The interference mitigation parameters comprise generating precoding weights and beamsteering weights of antennas, for example.

When the SAS initiates a session based interface between the network nodes within a cluster or between clusters of network nodes, the SAS receives indications of interference between the network nodes within a cluster or between clusters of network nodes. The indications of interference include for example interference mitigation parameters determined by Interference Alignment (IA) computed by one or more network nodes of a cluster, interference mitigation parameters determined by an Active Antenna System (AAS) at each of the network node of a cluster and interference mitigation parameters determined by an IA plus AAS.

Now turning to FIG. 11, a method 1100 in a controlling node for controlling resources in a shared channel will be described. The method 1100 corresponds to method 700, in which some terms have been better defined.

Method 1100 starts with receiving from the network node, a request for resources in a shared channel (block 1110).

Method 1100 continues with, in response to the request, determining a utility function representing a performance metric for the network node based on transmissions from other network nodes using the shared channel (block 1120).

Method 1100 further continues with, in response to determining that the utility function satisfies a threshold, granting the resources in the shared channel to the network node (block 1130).

For example, the controlling node is a spectrum access system. And the utility function can comprise an interference function that measures an impact of an interference level due to transmissions of the network node requesting the resources to the other network nodes, in the shared channel. For example, the interference function can comprise one of Signal-to-Interference-plus Noise Ratio (SINR) and Signal Leakage-to-Noise Ratio (SLNR). Furthermore, the interference level can be determined through a user value function and an evaluation grid. The user value function reflects a service value that a user will receive from the network node and the evaluation grid represents a geographical area. In some embodiments, the user value function is dependent on a signal received from the network node and interferences generated by the other network nodes.

In some embodiments, method 1100 can calculate a relative user value, in a coverage area of the network node, wherein the relative user value is a difference of the user value before the network node is granted the resources in the shared channel and after the network node is granted the resources in the shared channel.

In some embodiments, method 1100 can further determine an average relative user value, in which the determined relative user value is averaged over the coverage area of the network node.

In some embodiments, method 1100 can further determine a total average relative user value, in which the determined total average relative user value is averaged over all the other network nodes using the shared channel. Furthermore, method 1100 determines that the utility function satisfies a threshold when it determines that the total average relative user value is equal or superior to the threshold.

In some embodiments, method 1100 can create clusters of network nodes when granting the resources in the shared channel to network nodes based on the utility function. Furthermore, method 1300 can mitigate interference between clusters of network nodes and within a cluster of network nodes.

To do so, in some embodiments, method 1100 calculates interference mitigation parameters using one or more of Interference Alignment (IA), Active Antenna System (AAS) and IA plus AAS. For example, calculating the interference mitigation parameters comprises generating precoding weights and beamsteering weights of antennas.

In some embodiments, method 1100 can initiate a session based interface between the network nodes within the cluster or between the clusters of network nodes for receiving indications of interference between the network nodes within the cluster or between the clusters of network nodes. For example, receiving the indications of interference comprises receiving interference mitigation parameters determined by Interference Alignment (IA) computed by one or more network nodes of the cluster. Receiving the indications of interference can also comprise receiving interference mitigation parameters determined by an Active Antenna System (AAS) at each of the network node of the cluster. Receiving the indications of interference can further comprise receiving interference mitigation parameters determined by an IA plus AAS.

Figure 9:
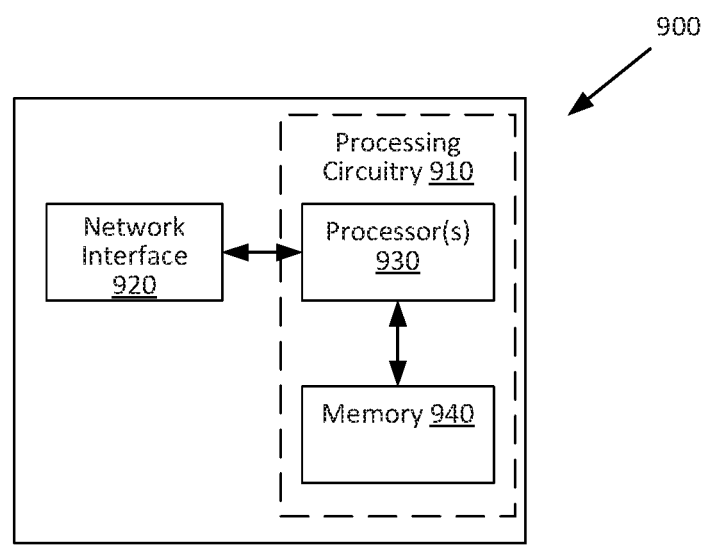
FIG. 9 is a schematic illustration of a controlling node, according to an embodiment.

FIG. 9 is a block diagram of an exemplary controlling node 900, such as SAS1, that may be used for allowing wireless communications in a shared spectrum. The controlling node 900 includes a processing circuitry 910, and a network interface 920. The circuitry 910 may include one or more (node) processors 930, and memory 940. In some embodiments, the one or more processors 930 executes the method 700 and 1100 and all embodiments as described above. The memory 940 stores the instructions for execution by the one or more processors 930, and the network interface 920 communicates signals to the other elements, such as the FCC databases, the CBSD, the ESC, the domain proxy, etc.

The one or more processors 930 may include any suitable combination of hardware and software implemented in one or more modules to execute instructions and manipulate data to perform some or all of the described functions of the SAS, such as those described above. In some embodiments, the one or more processors 930 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the one or more processors 930 may comprise one or more of the modules discussed below with respect to FIG. 10.

The memory 940 is generally operable to store instructions, such as a computer program, software, an application including one or more of logic, rules, algorithms, code, tables, etc. and/or other instructions capable of being executed by one or more processors 930. Examples of memory 940 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

In some embodiments, the network interface 920 is communicatively coupled to the one or more processors 930 and may refer to any suitable device operable to receive input for the controlling node 900, send output from the controlling node 900, perform suitable processing of the input or output or both, communicate to other devices, or any combination of the preceding. The network interface 920 may include appropriate hardware (e.g., port, modem, network interface card, etc.) and software, including protocol conversion and data processing capabilities, to communicate through a network.

Other embodiments of the controlling node 900 may include additional components beyond those shown in FIG. 9 that may be responsible for providing certain aspects of a SAS' functionality, including any of the functionality described above and/or any additional functionality (including any functionality necessary to support the solutions described above).

Processors, interfaces, and memory similar to those described with respect to FIG. 9 may be included in other network nodes. Other network nodes may optionally include or not include a wireless interface. Functionalities described could reside within the same node or could be distributed across a plurality of nodes and network nodes.

Figure 10:
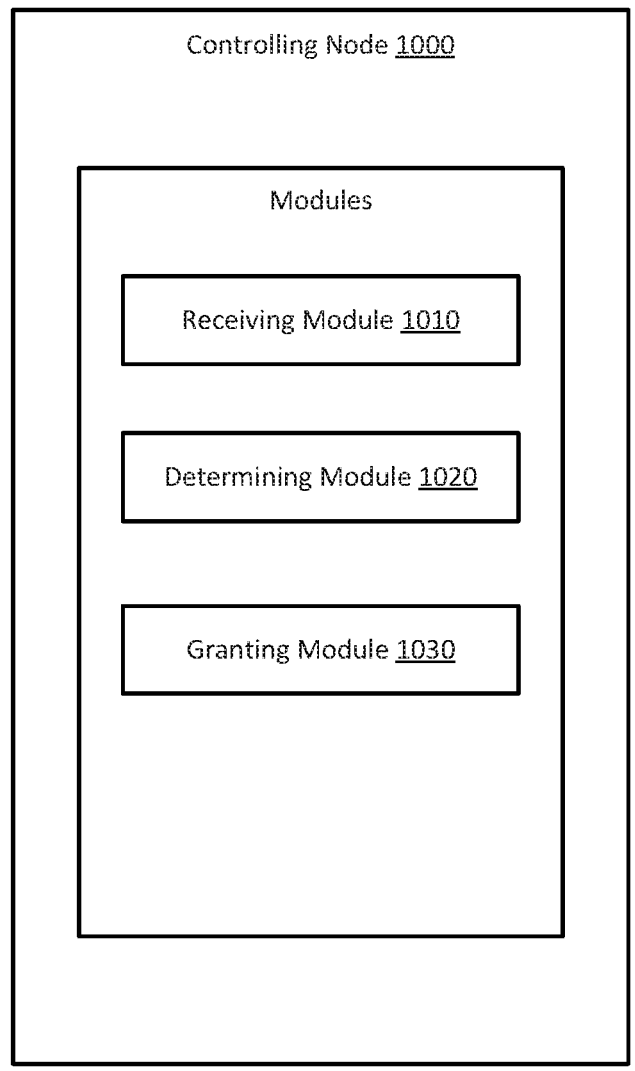
FIG. 10 is a schematic illustration of a controlling node, according to another embodiment.

FIG. 10 illustrates an example of a controlling node 1000 in accordance with another embodiment. The controlling node 1000 could be a SAS. The controlling node 1000 may include a receiving module 1010, a determining module 1020 and a granting module 1030.

Figure 11:
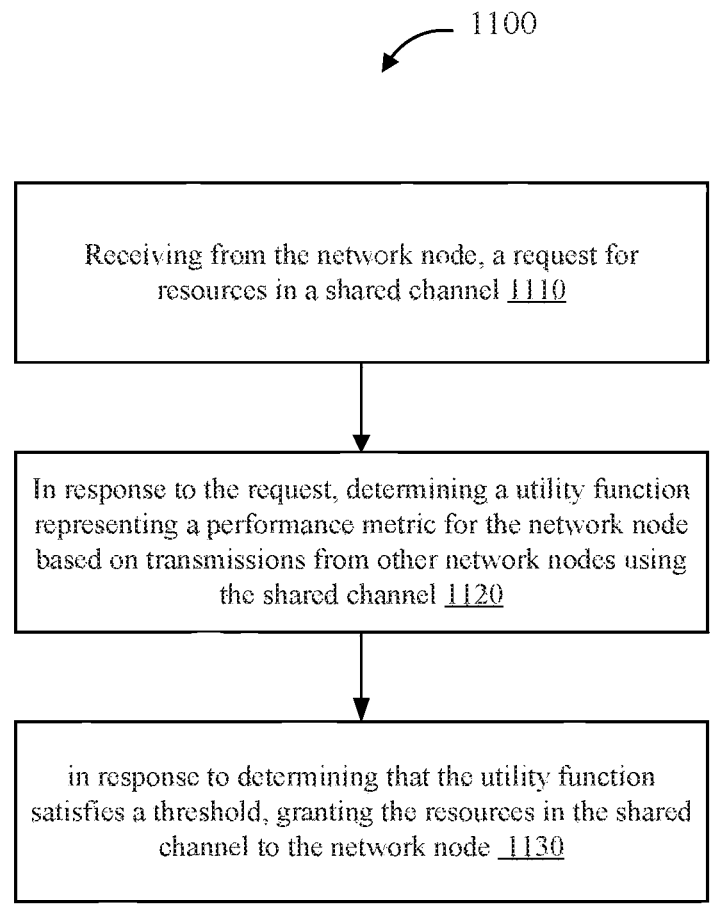
FIG. 11 illustrates a flowchart of a method in a controlling node, according to an embodiment.

In certain embodiments, the receiving module 1010 may perform a combination of steps that may include steps 710 of FIG. 7 and step (or block) 1110 of FIG. 11.

The determining module 1020 may perform a combination of steps that may include steps such as Step 720 in FIG. 7 and step (or block) 1120 of FIG. 11.

In certain embodiments, the granting module 1030 may perform a combination of steps that may include steps such as Step 730 in FIG. 7 and step (or block) 1130 of FIG. 11.

In certain embodiments, the receiving module 1010, the determining module 1020 and the granting module 1030 may be implemented using one or more processors, such as described with respect to FIG. 9. The modules may be integrated or separated in any manner suitable for performing the described functionality.

It should be noted that according to some embodiments, virtualized implementations of the controlling node of FIGS. 9 and 10 and of the CBSDs are possible. As used herein, a "virtualized" network node or controlling node (e.g., a virtualized base station or a virtualized radio access node or a SAS) is an implementation of the network node or controlling node in which at least a portion of the functionality of the network node/controlling node is implemented as a virtual component (e.g., via a virtual machine(s) or container(s) executing on a physical processing node(s) in a network(s)). As such, the functions of the controlling nodes 900 and 1000 (described hereinabove) could be distributed across a cloud computing system.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any two or more embodiments described in this document may be combined in any way with each other.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

Some of the abbreviations used in this disclosure include:
AAS Active Antenna System
ASA Authorized Shared Access
ARUV Average Relative User Value
CBRS Citizen's Broadband Radio Service
CBSD Citizens Broadband radio Service Device
CxM Co-existence ManagerCxG—Co-existence GroupCSI-RS Channel State Information Reference Signal
ESC: Environmental Sensing Capability
eNB E-UTRAN NodeB
E-UTRAN Evolved UTRAN
UTRAN Universal Terrestrial Radio Access Network
GAA: General Authorized Access
IA Interference alignment
ICIC Inter-cell interference coordination
ICG Interference coordination group
LSA Licensed Shared Access
PAL: Priority Access License
PPA: PAL Protection Area
RAT Radio Access Technology
RSRP Reference Signal Received Power
RSRQ Reference Signal Received Quality
RS-SINR Reference Signal SINR
RUV Relative User Value
SARUV Sum of Relative Average User Values
SAS Spectrum Access System
SINR Signal to Interference plus Noise Ratio
SLNR Signal leakage-to-noise ratio
UV User Value function
gNB Base station in NR
NR New Radio
WISPA Wireless Internet Service Provider Association

EXAMPLE EMBODIMENTS

1. A method in a controlling node, the method comprising:
   receiving a request from a network node for a grant of resources in a shared spectrum;
   in response to the request, determining an interference level based on the grant of resources to the network node; and
   in response to determining that the interference level satisfies a threshold, granting the resources to the network node.

2. The method of example 1, wherein the controlling node is a spectrum access system.

3. The method of examples 1 to 2, wherein the interference level is determined through a user value function and an evaluation grid.

4. The method of example 3, further comprising calculating an average relative user value, in a coverage area of the network node before it is granted resources and after the network node is granted resources.

5. The method of example 4, wherein determining that the interference level satisfies a threshold comprises determining that the average relative user value is equal or superior to the threshold.

6. The method of any examples 1 to 5, further comprising creating clusters of network nodes when granting the resources to the network nodes based on the determined interference value.

7. The method of example 6, further comprising mitigating interference between clusters of network nodes and within a cluster of network nodes.

8. The method of example 7, wherein mitigating interference between clusters of network nodes and within a cluster of network nodes comprises calculating interference mitigation parameters using Interference Alignment (IA), Active Antenna System (AAS) and/or IA plus AAS.

9. The method of example 8, wherein calculating the interference mitigation parameters comprises generating precoding weights and beamsteering of antennas.

10. The method of example 7, further comprising initiating a session based interface between the network nodes within a cluster or between clusters of network nodes for receiving indications of interference between the network nodes within a cluster or between clusters of network nodes.

11. The method of example 10, wherein receiving the indications of interference comprising receiving interference mitigation parameters determined by Interference Alignment (IA) computed by one or more network nodes of a cluster.

12. The method of example 10, wherein receiving the indications of interference comprising receiving interference mitigation parameters determined by an Active Antenna System (AAS) at each of the network node of a cluster.

13. The method of example 10, wherein receiving the indications of interference comprising receiving interference mitigation parameters determined by an IA plus AAS.

14. A controlling node comprising a processing circuitry, operable to perform any of one or more of the methods of examples 1 to 13.

15. A computer program product comprising a non-transitory computer readable storage medium having computer readable program code embodied in the medium, the computer readable program code comprising computer readable code to perform any one or more of the methods of examples 1-13.

16. A controlling node including circuitry containing instructions which, when executed, cause the controlling node to perform any of the methods of the example embodiments described above.

17. A non-transitory computer readable memory configured to store executable instructions for a controlling node, the executable instructions when executed by one or more processors cause the controlling node to perform any of the methods of the example embodiments described above.

What is claimed is:

1. A method in a controlling node for controlling resources in a shared channel, the method comprising:
   receiving from a network node, a request for resources in the shared channel;
   in response to the request, determining a utility function representing a performance metric for the network node based on transmissions from other network nodes using the shared channel; and
   in response to determining that the utility function satisfies a threshold, granting the resources in the shared channel to the network node;
   wherein the utility function comprises an interference function that measures an impact of an interference level due to transmissions of the network node requesting the resources to the other network nodes, in the shared channel, and wherein the interference level is determined through a user value function and an evaluation grid.

2. The method of claim 1, wherein the interference function comprises one of Signal-to-Interference-plus Noise Ratio (SINR) and Signal Leakage-to-Noise Ratio (SLNR).

3. The method of claim 1, wherein the user value function reflects a service value that a user will receive from the network node.

4. The method of claim 1, wherein the user value function is dependent on a signal received from the network node and interferences generated by the other network nodes.

5. The method of claim 1, further comprising calculating a relative user value, in a coverage area of the network node, wherein the relative user value is a difference of the user value before the network node is granted the resources in the shared channel and after the network node is granted the resources in the shared channel.

6. The method of claim 5, further comprising determining an average relative user value, in which the determined relative user value is averaged over the coverage area of the network node.

7. The method of claim 6, further comprising determining a total average relative user value, in which the determined total average relative user value is averaged over all the other network nodes using the shared channel.

8. The method of claim 7, wherein determining that the utility function satisfies a threshold comprises determining that the total average relative user value is equal or superior to the threshold.

9. A controlling node for controlling resources in a shared channel, the controlling node comprising a processor and a memory, the memory containing instructions executable by the processor, whereby the network node is operative to:
   receive from a network node, a request for resources in the shared channel;
   in response to the request, determine a utility function representing a performance metric for the network node based on transmissions from other network nodes using the shared channel; and
   in response to determining that the utility function satisfies a threshold, grant the resources in the shared channel to the network node; wherein the utility function comprises an interference function that measures an impact of an interference level due to transmissions of the network node requesting the resources to the other network nodes, in the shared channel, and wherein the interference level is determined through a user value function and an evaluation grid.

10. The controlling node of claim 9, wherein the interference function comprises one of Signal-to-Interference-plus Noise Ratio (SINR) and Signal Leakage-to-Noise Ratio (SLNR).

11. The controlling node of claim 9, wherein the user value function reflects a service value that a user will receive from the network node.

12. The controlling node of claim 9, wherein the user value function is dependent on a signal received from the network node and interferences generated by the other network nodes.

13. The controlling node of claim 9, wherein the processor is further configured to calculate a relative user value, in a coverage area of the network node, wherein the relative user value is a difference of the user value before the network node is granted the resources in the shared channel and after the network node is granted the resources in the shared channel.

14. The controlling node of claim 13, wherein the processor is further configured to determine an average relative user value, in which the determined relative user value is averaged over the coverage area of the network node.

15. The controlling node of claim 14, wherein the processor is further configured to determine a total average relative user value, in which the determined total average relative user value is averaged over all the other network nodes using the shared channel.

16. The controlling node of claim 15, wherein the processor is further configured to determine that the total average relative user value is equal or superior to the threshold.

* * * * *